US011562393B1

(12) United States Patent
Chen et al.

(10) Patent No.: US 11,562,393 B1
(45) Date of Patent: Jan. 24, 2023

(54) SELF-CONSISTENT INCEPTION ARCHITECTURE FOR EFFICIENT BASELINING MEDIA CREATIVES

(71) Applicant: Tatari, Inc., San Francisco, CA (US)

(72) Inventors: Wei Chen, Santa Monica, CA (US); Michael D. Swinson, Santa Monica, CA (US)

(73) Assignee: TATARI, INC., San Francisco, CA (US)

( * ) Notice: Subject to any disclaimer, the term of this patent is extended or adjusted under 35 U.S.C. 154(b) by 0 days.

(21) Appl. No.: 16/705,813

(22) Filed: Dec. 6, 2019

Related U.S. Application Data

(60) Provisional application No. 62/776,583, filed on Dec. 7, 2018.

(51) Int. Cl.
*G06Q 30/02* (2012.01)

(52) U.S. Cl.
CPC ..... *G06Q 30/0246* (2013.01); *G06Q 30/0277* (2013.01)

(58) Field of Classification Search
CPC .............. G06Q 30/0246; G06Q 30/0277
See application file for complete search history.

(56) References Cited

U.S. PATENT DOCUMENTS

| 8,386,310 | B2 | 2/2013 | Weyer |
| 8,510,770 | B1 | 8/2013 | Oztaskent |
| 8,762,201 | B1 | 6/2014 | Noonan |
| 9,852,163 | B2 | 12/2017 | Srivastava |
| 10,467,653 | B1 * | 11/2019 | Avedissian ............ G06T 1/0064 |
| 10,497,021 | B1 | 12/2019 | Eberstein |

(Continued)

FOREIGN PATENT DOCUMENTS

| GB | 2550839 | 12/2017 |
| WO | WO 2014011139 | 1/2014 |
| WO | WO 2020005240 | 1/2020 |

OTHER PUBLICATIONS

G. W. S. Cleveland, Visual and Computational Considerations in Smoothing Scatterplots by Locally Weighted Regression, Computer Science and Statistics: Eleventh Annual Symposium on the Interface, pp. 96-100, Institute of Statistics, North Carolina State University, Raleigh, N.C., 1978. (Year: 1978).*

(Continued)

*Primary Examiner* — Eric R Netzloff
(74) *Attorney, Agent, or Firm* — Sprinkle IP Law Group

(57) ABSTRACT

A self-consistent inception architecture includes a process that integrates online data and offline data to determine an estimated lift ("prior lift") in the number of unique visitors (UVs) to a website caused by a television (TV) spot airing on an offline medium. The prior lift is used to adjust a UV profile of the website. A baseline thus produced is fitted through an inception process in which a locally weighted scatterplot smoothing algorithm is applied iteratively until a final baseline converges. The baseline from the inception process is used to determine a calculated lift. If the prior lift and the calculated lift are not consistent (e.g., within a threshold), the process is run iteratively until the prior lift and the calculated lift are consistent. The calculated lifts can be used to determine and visualize performance metric(s) relating to media creatives such as TV spots airing in the physical world.

17 Claims, 18 Drawing Sheets

(56) References Cited

U.S. PATENT DOCUMENTS

| | | | |
|---|---|---|---|
| 11,132,706 B1 | 9/2021 | Swinson | |
| 11,212,566 B1 | 12/2021 | Swinson | |
| 11,334,911 B1 | 5/2022 | Swinson | |
| 11,334,912 B1 | 5/2022 | Chen | |
| 11,348,136 B1 | 5/2022 | Swinson | |
| 11,503,351 B2 | 11/2022 | Swinson | |
| 2007/0174114 A1 | 7/2007 | Bigby | |
| 2008/0004884 A1 | 1/2008 | Flake | |
| 2008/0082381 A1 | 4/2008 | Muller | |
| 2008/0235089 A1 | 9/2008 | Weyer | |
| 2008/0255904 A1* | 10/2008 | Park | G06Q 30/02 705/14.45 |
| 2008/0256061 A1 | 10/2008 | Chang | |
| 2009/0006188 A1 | 1/2009 | Guo | |
| 2009/0049468 A1 | 2/2009 | Shkedi | |
| 2009/0172728 A1 | 7/2009 | Shkedi | |
| 2009/0254420 A1 | 10/2009 | Curd | |
| 2010/0082424 A1 | 4/2010 | Yemeni | |
| 2010/0228593 A1 | 9/2010 | Belwadi | |
| 2010/0287029 A1* | 11/2010 | Dodge | G06Q 30/02 705/7.31 |
| 2011/0087546 A1 | 4/2011 | Fordyce | |
| 2011/0119126 A1* | 5/2011 | Park | G06Q 30/02 705/14.45 |
| 2011/0167145 A1 | 7/2011 | Bush | |
| 2011/0231245 A1 | 9/2011 | Bhatia | |
| 2011/0246297 A1 | 10/2011 | Buchalter | |
| 2011/0302022 A1 | 12/2011 | Fordyce | |
| 2012/0054019 A1 | 3/2012 | Kitts | |
| 2012/0072997 A1 | 3/2012 | Carlson | |
| 2012/0096489 A1 | 4/2012 | Shkedi | |
| 2012/0109749 A1 | 5/2012 | Subramanian | |
| 2012/0158505 A1 | 6/2012 | Jaladanki | |
| 2012/0303414 A1* | 11/2012 | Dodge | G06Q 30/0202 705/7.31 |
| 2013/0046621 A1 | 2/2013 | Asseoff | |
| 2013/0117454 A1 | 5/2013 | Rangarajan | |
| 2013/0261482 A1* | 10/2013 | Marziliano | A61B 5/7207 600/521 |
| 2013/0268357 A1 | 10/2013 | Heath | |
| 2014/0006158 A1 | 1/2014 | Cooper | |
| 2014/0012659 A1 | 1/2014 | Yan | |
| 2014/0040020 A1* | 2/2014 | Shanmugam | G06Q 30/0246 705/14.45 |
| 2014/0082664 A1 | 3/2014 | Shkedi | |
| 2014/0100947 A1 | 4/2014 | Kitts | |
| 2014/0164101 A1 | 6/2014 | S | |
| 2014/0222549 A1 | 8/2014 | Bruich | |
| 2014/0223458 A1 | 8/2014 | Smith | |
| 2014/0236705 A1 | 8/2014 | Shao | |
| 2014/0244368 A1* | 8/2014 | Singhania | G06Q 30/0211 705/14.13 |
| 2014/0257979 A1 | 9/2014 | Luke | |
| 2014/0289004 A1* | 9/2014 | Monforte | G06Q 30/0202 705/7.31 |
| 2014/0316883 A1 | 10/2014 | Kitts | |
| 2014/0337122 A1* | 11/2014 | Bansal | G06Q 30/0201 705/14.45 |
| 2014/0358666 A1 | 12/2014 | Baghaie | |
| 2014/0379428 A1 | 12/2014 | Phansalkar | |
| 2015/0046249 A1 | 2/2015 | Qi | |
| 2015/0066626 A1 | 3/2015 | Farahat | |
| 2015/0149277 A1 | 5/2015 | Mankoff | |
| 2015/0154632 A1 | 6/2015 | Jindal | |
| 2015/0186925 A1 | 7/2015 | Chittailappilly | |
| 2015/0235261 A1 | 8/2015 | Shulman | |
| 2015/0237395 A1 | 8/2015 | Barney | |
| 2015/0262221 A1 | 9/2015 | Nakano | |
| 2015/0269606 A1 | 9/2015 | Hewett | |
| 2015/0341684 A1 | 11/2015 | Kitts | |
| 2015/0348119 A1 | 12/2015 | Ferber | |
| 2015/0350706 A1 | 12/2015 | Ferber | |
| 2016/0019582 A1 | 1/2016 | Bindra | |
| 2016/0117355 A1 | 4/2016 | Krishnamurthy | |
| 2016/0134934 A1 | 5/2016 | Jared | |
| 2016/0155141 A1 | 6/2016 | Song | |
| 2016/0180375 A1 | 6/2016 | Rose | |
| 2016/0210658 A1 | 7/2016 | Chittilappilly | |
| 2016/0210659 A1 | 7/2016 | Chittilappilly | |
| 2016/0225014 A1 | 8/2016 | Mitra | |
| 2016/0239571 A1 | 8/2016 | Rowe | |
| 2016/0358227 A1 | 12/2016 | McAfee | |
| 2017/0034591 A1 | 2/2017 | Ray | |
| 2017/0091809 A1 | 3/2017 | Liu | |
| 2017/0091810 A1 | 3/2017 | McGovern | |
| 2017/0195748 A1 | 7/2017 | Shkedi | |
| 2017/0201374 A1 | 7/2017 | Bosworth | |
| 2017/0223425 A1 | 8/2017 | Kitts | |
| 2017/0228768 A1 | 8/2017 | Saxena | |
| 2017/0238025 A1 | 8/2017 | Riedl | |
| 2017/0257410 A1 | 9/2017 | Gattis | |
| 2017/0323330 A1 | 11/2017 | Chittilappilly | |
| 2017/0330219 A1 | 11/2017 | Feldman | |
| 2017/0337578 A1 | 11/2017 | Chittilappilly | |
| 2017/0337588 A1 | 11/2017 | Chittilappilly | |
| 2018/0005140 A1 | 1/2018 | Chittilappilly | |
| 2018/0068343 A1 | 3/2018 | Hammock | |
| 2018/0096397 A1 | 4/2018 | Goeldi | |
| 2018/0139514 A1 | 5/2018 | Smith | |
| 2018/0152766 A1 | 5/2018 | Kitts | |
| 2018/0192128 A1 | 7/2018 | Manus | |
| 2018/0218383 A1 | 8/2018 | Shen | |
| 2018/0260715 A1 | 9/2018 | Yan | |
| 2018/0285469 A1 | 10/2018 | Hahn | |
| 2018/0308123 A1 | 10/2018 | Zhong | |
| 2018/0338189 A1 | 11/2018 | Ray | |
| 2018/0357678 A1 | 12/2018 | Diorio | |
| 2019/0050891 A1 | 2/2019 | Chung | |
| 2019/0050893 A1 | 2/2019 | Stuttle | |
| 2019/0087469 A1 | 3/2019 | Zhang | |
| 2019/0104199 A1 | 4/2019 | Rothman | |
| 2019/0138563 A1 | 5/2019 | Odgen | |
| 2019/0141013 A1 | 5/2019 | Mail | |
| 2019/0236639 A1 | 8/2019 | Mitra | |
| 2019/0273961 A1 | 9/2019 | Kitts | |
| 2019/0278378 A1 | 9/2019 | Yan | |
| 2019/0318379 A1 | 10/2019 | Patel | |
| 2019/0378074 A1 | 12/2019 | McPhatter | |
| 2020/0027121 A1 | 1/2020 | Avedissian | |
| 2020/0065854 A1 | 2/2020 | Eberstein | |
| 2022/0086513 A1 | 3/2022 | Swinson | |
| 2022/0215427 A1 | 7/2022 | Swinson | |
| 2022/0237653 A1 | 7/2022 | Chen | |

OTHER PUBLICATIONS

H. Andreas F. Ruckstuhl, Matthew P. Jacobson, Robert W. Field, James A. Dodd, Baseline subtraction using robust local regression estimation, Journal of Quantitative Spectroscopy and Radiative Transfer, vol. 68, Issue 2, 2001, pp. 179-193, ISSN 0022-4073. (Year: 2001).*

I. Lambert, Diane , and Pregibon, Daryl , (2008), "Online Effects of Offline Ads," in ADKDD '08: Proceedings of the 2nd International Workshop on Data Mining and Audience Intelligence for Advertising, New York: Association for Computing Machinery, 10-17. (Year: 2008).*

William S. Cleveland (1979) Robust Locally Weighted Regression and Smoothing Scatterplots, Journal of the American Statistical Association, 74:368, 829-836, DOI: 10.1080/01621459.1979. 10481038 (Year: 1979).*

Gallego, V., Suárez-García, P., Angulo, P., Gómez-Ullate, D.: Assessing the effect of advertising expenditures upon sales: a Bayesian structural time series model. Appl. Stoch. Model. Bus. Ind. 35, 479-491 (2019). https://doi.org/10.1002/asmb.2460 (Year: 2019).*

R. Y. Du, L. Xu and K. C. Wilbur, "Tv ads and search spikes: Toward a deeper understanding", MIS Quarterly, 2017. (Year: 2017).*

Kitts, Brendan, Bardaro, Michael, Au, Dyng, Lee, Al, Lee, Sawin, Borchardt, Jon. (2014), "Can Television Advertising Impact Be Measured on the Web? Web Spike Response as a Possible Conver-

(56) References Cited

OTHER PUBLICATIONS sion Tracking System for Television," in Proceedings of the Eighth International Workshop on Data Mining for Online (Year: 2014).*
In Proceedings of the Eighth International Workshop on Data Mining for Online Advertising. New York: Association for Computing Machinery, 1-9. (Year: 2014).*
Cetintas, S., Chen, D. & Si, L. Forecasting user visits for online display advertising. Inf Retrieval 16, 369-390 (2013). https://doi.org/10.1007/s 10791-012-9201-4 (Year: 2012).*
Komsta, Ł. Comparison of Several Methods of Chromatographic Baseline Removal with a New Approach Based on Quantile Regression. Chromatographia 73, 721-731 (2011). https://doi.org/10.1007/s10337-011-1962-1 (Year: 2011).*
Zhang, Z.-M., Chen, S., and Liang, Y.-Z. (2010). Baseline correction using adaptive iteratively reweighted penalized least squares. Analyst 135, 1138-1146. doi:10.1039/b922045c (Year: 2010).*
S.-J. Baek, A. Park, Y.-J. Ahn, J. Choo Baseline correction using asymmetrically reweighted penalized least squares smoothing Analyst, 140 (2015), pp. 250-257 (Year: 2015).*
X. Jungherr, A. and Jurgens, P. (2013), "Forecasting the pulse: How deviations from regular patterns in online data can identify offline phenomena", Internet Research, vol. 23 No. 5, pp. 589-607. https://doi.org/10.1108/IntR-06-2012-0115 (Year: 2013).*
Office Action for U.S. Appl. No. 16/363,801, dated Jul. 7, 2020, 19 pgs.
Office Action for U.S. Appl. No. 16/360,456, dated Oct. 13, 2020, 13 pgs.
Office Action for U.S. Appl. No. 16/363,801, dated Jan. 15, 2021, 22 pgs.
Bhatia, Tarun, et al., Method and System of Scaling Online-Offline Ad Effectiveness Measurements across Devices in a Network, IP.com Prior Art Database Technical Disclosure, IPCOM000226497D, Apr. 9, 2013, 6 pgs.
Office Action for U.S. Appl. No. 16/360,456, dated Apr. 27, 2021, 16 pgs.
Eisenberg, Andrew, et al., "SQL:2003 Has Been Published," ACM.org, SIGMOD Record, vol. 33, No. 1, Mar. 2004, pp. 119-126.
Advertisement System, Method and Computer Program Product, an IP.com Prior Art Database Technical Disclosure, IPCOM000138557D, Jul. 24, 2006, 40 pgs.
Weng, Chien-I, et al., Did you LINE Today? Strategies for Creating LINE Online to Offline Customer Experiences, 49th Hawaii Int'l Conf, on System Sciences, IEEE Computer Society, 2016, pp. 2136-2145.
Office Action for U.S. Appl. No. 16/706,061, dated May 11, 2021, 18 pgs.
Office Action for U.S. Appl. No. 16/365,448, dated Jun. 23, 2021, 8 pgs.
Notice of Allowance for U.S. Appl. No. 16/706,061, dated Mar. 18, 2022, 7 pgs.
Notice of Allowance for U.S. Appl. No. 16/716,161, dated Mar. 30, 2022, 8 pgs.
Office Action for U.S. Appl. No. 16/706,061, dated Oct. 25, 2021, 15 pgs.
Kitts, et al., Attribution of Conversion Events to Multi-Channel Media, 2010 IEEE International Conference on Data Mining, pp. 881-886.
Office Action for U.S. Appl. No. 16/716,161, dated Dec. 9, 2021, 21 pgs.
Notice of Allowance for U.S. Appl. No. 16/360,456, dated Dec. 22, 2021, 14 pgs.
Notice of Allowance for U.S. Appl. No. 16/360,456, dated Apr. 5, 2022, 9 pgs.
Office Action for U.S. Appl. No. 16/705,813, dated Apr. 13, 2022, 25 pgs.
Notice of Allowance for U.S. Appl. No. 17/533,214, dated Jul. 11, 2022, 6 pgs.
Notice of Allowance for U.S. Appl. No. 16/365,448, dated Oct. 6, 2021, 4 pgs.
Notice of Allowance for U.S. Appl. No. 17/533,214, dated Aug. 12, 2022, 5 pages.

* cited by examiner

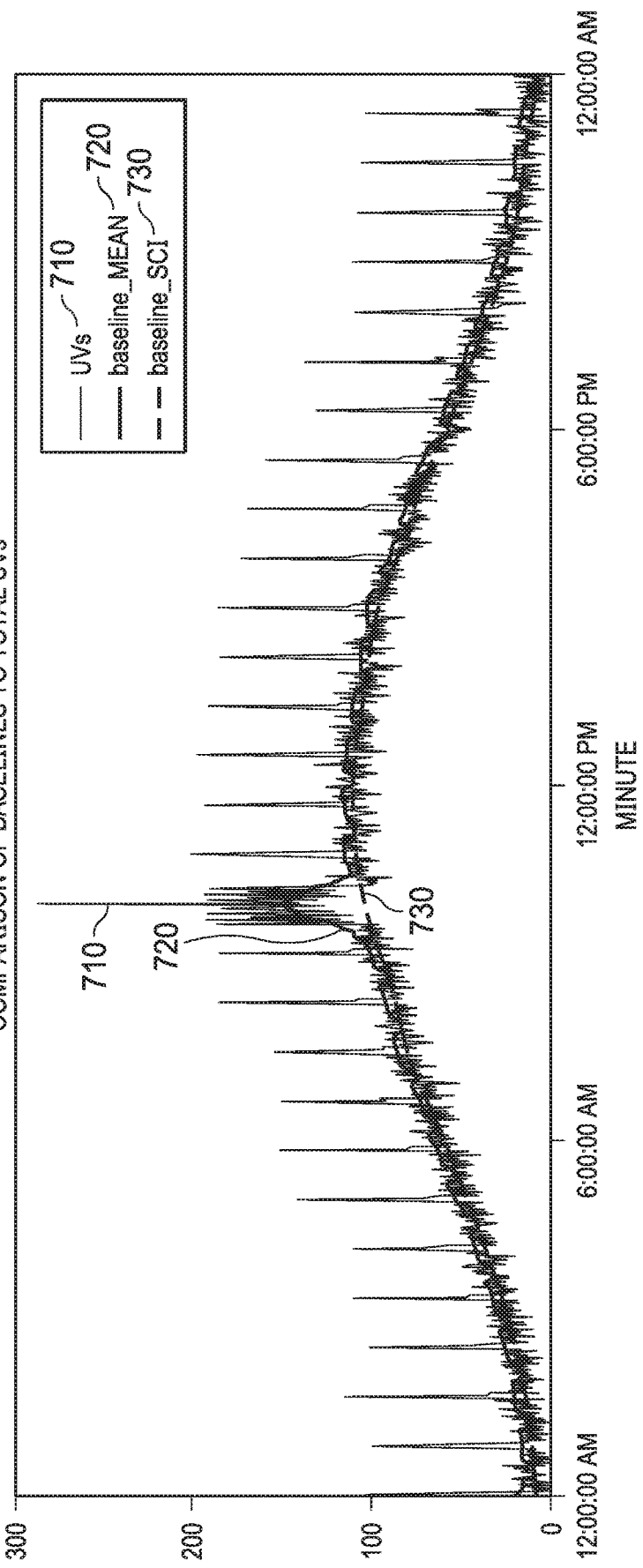

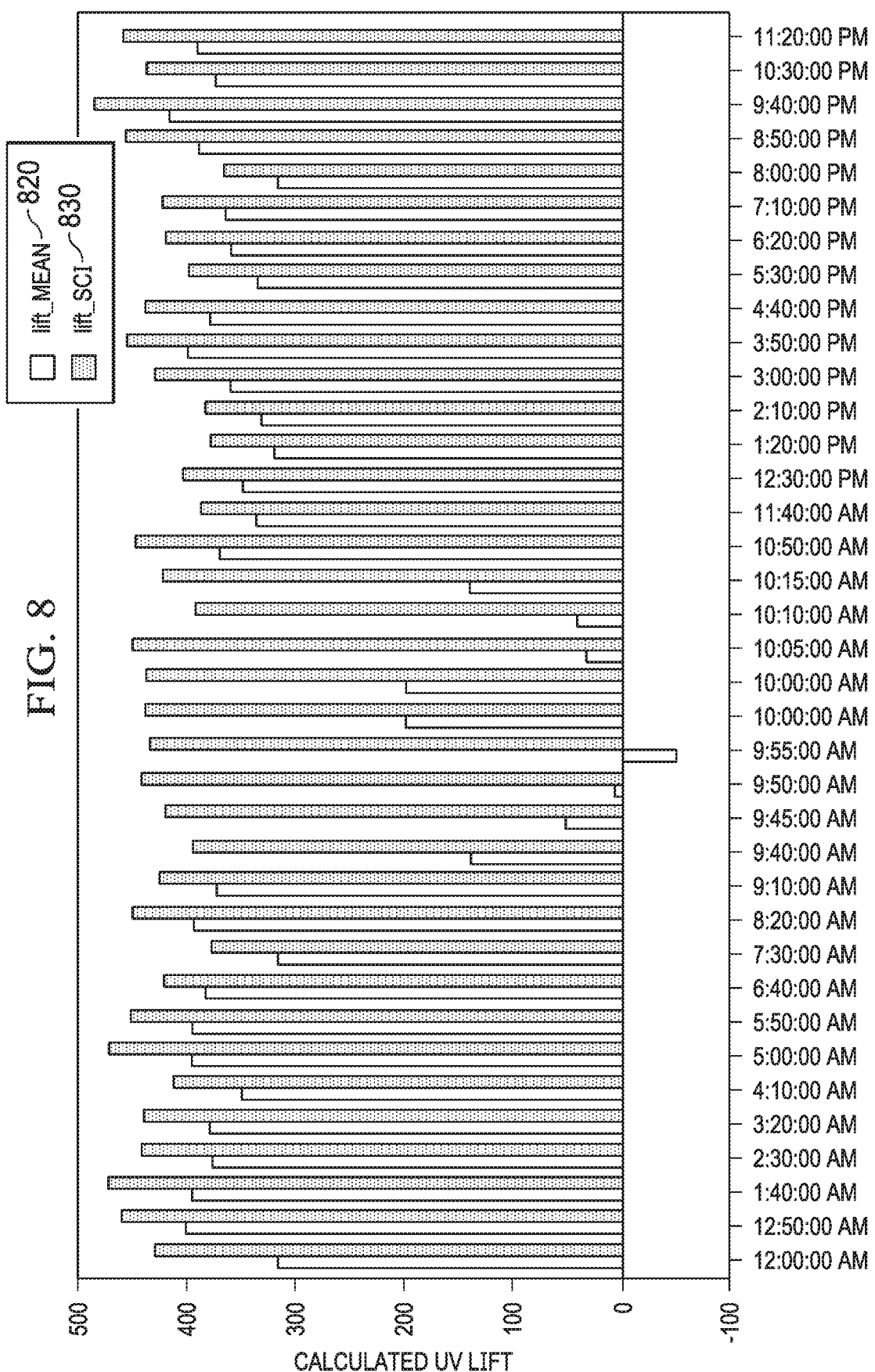

| Cost/Visitor $0.91 | | Impressions 35.6M | Visitor Lift 199.7k | | Spend $181,758 ☐ Savings $79.1k | | Spots Aired 3,243 🎁 Bonus $229 |
|---|---|---|---|---|---|---|---|
| Aired Networks | | | | | | | Browse All Networks |
| Network ↓ | Type | CPV | Relative Performance | | Impressions | Spend | ☐ Savings |
| Network A | Cable (National-Local) | $0.78 | | +17% | N/A | $10,018 | $3.8k |
| Network B | Cable (National) | $1.82 | -50% | | 2.1M | $3,512 | $1.5k |
| Network C | Cable (National/Local) | $0.72 | | +27% | N/A | $1,707 | $548 |
| Network D | Cable (National) | $1.03 | -12% | | 3.4M | $15,232 | $8.6k |
| Network E | Cable (National) | $3.27 | -72% | | 441.9k | $850 | $1.1k |
| Network F | Cable (National) | $2.29 | -60% | | 678.5k | $3,111 | $884 |
| Network G | Cable (National) | $0.99 | -8% | | 8.6M | $13,490 | $4.5k |
| Network H | Cable (National) | $0.54 | | +68% | N/A | $1,624 | $1.8k |
| Network I | Cable (National) | $0.30 | | +201% | N/A | $711 | $309 |
| Network J | Cable (National/Local) | $0.61 | | +48% | N/A | $6,256 | $2.6k |
| | | | | | | 1-10 of 64 | Show All ⌄ |

SELF-CONSISTENT INCEPTION ARCHITECTURE FOR EFFICIENT BASELINING MEDIA CREATIVES

CROSS-REFERENCE TO RELATED APPLICATION(S)

This application claims a benefit of priority under 35 U.S.C. § 119(e) from U.S. Provisional Application No. 62/776,583, filed Dec. 7, 2018, entitled "SELF-CONSISTENT INCEPTION ARCHITECTURE FOR EFFICIENT BASELINING MEDIA CREATIVES," the entire disclosure of which is fully incorporated by reference herein for all purposes.

TECHNICAL FIELD

This disclosure relates generally to data processing for performance analysis. More particularly, this disclosure relates to a new self-consistent inception (SCI) architecture for efficient baselining media creatives.

BACKGROUND OF THE RELATED ART

With the advent of the Internet, many aspects of modern life are now digitally connected through the seemingly ubiquitous smart phones, smart televisions (TV), smart home appliances, Internet of Things (IoT) devices, websites, mobile apps, etc. Even so, many more analog aspects remain disconnected from this digital world. Linear TV is an example of an offline medium that is disconnected from the digital world.

"Linear TV" refers to real time (live) television services that transmit TV program schedules. Almost all broadcast TV services can be considered as linear TV. Non-linear TV covers streamlining and on-demand programming, which can be viewed at any time and is not constrained by real-time broadcast schedules. Video-on-demand (VOD) and near video-on-demand (NVOD) transmissions of pay-per-view programs over channel feeds are examples of non-linear TV.

Because linear TV is an offline medium, it is not possible to automatically collect information on viewers of linear TV. This creates a data gap problem. To address this data gap program, Nielsen Media Research devised audience measurement systems to determine the audience size and composition of television programming in the United States. Nielsen television ratings are gathered in one of two ways—using viewer diaries or set meters attached to TVs in selected homes. The former requires a target audience self-record their viewing habits. The latter requires a special device to collect specific viewing habits on a minute to minute basis and send the collected information to Nielsen's system over a phone line.

While Nielsen's audience measurement systems can provide some quantified measures of audience response to TV programs, the Nielsen television ratings do not measure conversion rates for TV commercials. Accordingly, a typical approach for evaluating the performance of a TV commercial is to define the efficiency (E) of that TV commercial as Response per Amount Spent where E is defined as E=100*lift/(ad spend). In this case, "lift" is a metric for measuring a TV commercial in the context of a particular type of campaign—in this example, for measuring how much increase (lift) per $100 ad spend. This approach is generally independent to where and when the TV commercial aired on television networks.

SUMMARY OF THE DISCLOSURE

The approach described above can be inadequate in some cases. For instance, in some cases, a company or organization may want to measure the effectiveness of a TV spot (or, the efficiency of an ad spend) in the physical world by the number of unique visitors (UVs) to its website in the online world. Typically, a TV spot that aired immediately prior a UV spike to the website (that can be measured by a server machine hosting the website) can be considered to have attributed to the UV spike. The integration under this spike is called a "lift," which is based on the difference between the actual number of UVs and a "baseline." Here, "baseline" refers to a UV curve for the website without any TV spot airing.

To accurately measure the advertising efficiency of a TV spot, the baseline should also be accurate. However, it is practically impossible, if not extremely difficult, to construct an accurate baseline for the website. One reason is that a website on the Internet can be continuously influenced by many factors in the real world. Another reason is that multiple TV spots could be airing at any given time in different places. Accordingly, UVs could visit the website from virtually anywhere for a variety of reasons—they could be influenced to visit the website by different TV spots aired at geographically disparate locations. Although they could also be influenced to visit the website and/or directed to the website from other sites on the Internet, this kind of online influences is considered as part of normal traffic to the website and thus is not isolated in determining a UV baseline for the website.

Theoretically, a UV baseline could be deduced by removing UV spikes attributable to TV spots from the actual UV numbers. However, intrinsic minute UV fluctuations are impossible to model.

An object of this disclosure is to provide a solution that can overcome these and other problems. Another object is to calculate a baseline from a UV curve without having to first calculating TV spot airing lift. Yet another object is to calculate lift from a non-lifted baseline. According to embodiments, these objects can be realized through a Self-Consistent Inception (SCI) architecture adapted for incorporating TV spot airing data (e.g., spot airing time, spend, etc.) and website traffic (e.g., unique visitors, number of installs, etc.) in an iterative manner.

In some embodiments, the SCI architecture includes a process adapted for determining, based on online data and offline data, an estimated lift in a number of UVs to a website caused by a TV spot airing on an offline medium, the estimated lift representing a prior lift. In some embodiments, the online data comprises the number of unique visitors to the website over a period of time during which the TV spot airing on the offline medium. In some embodiments, the offline data comprises spot airing time and spend associated with the TV spot. In some embodiments, the estimated lift is determined utilizing at least the spend associated with the TV spot.

In some embodiments, the process further includes adjusting, utilizing the prior lift, a UV profile of the website. In some embodiments, the adjusting comprises subtracting the prior lift from a UV line to thereby generate the baseline for the inception process, the baseline including the UV profile. In some embodiments, the UV profile of the website comprises a temporal response pattern or UV changes observable from website traffic data. In some embodiments, the temporal response pattern comprises a number of UVs on a minute-by-minute basis within a time window after the TV spot airing on the offline medium.

In some embodiments, the process further includes fitting a baseline through an inception process in which a locally weighted scatterplot smoothing (LOWESS) algorithm is applied iteratively until a final baseline converges; computing, utilizing the final baseline from the inception process, a calculated lift in the number of UVs to the website caused by the TV spot airing on the offline medium; and comparing the prior lift and the calculated lift for consistency. The calculated lift is computed by subtracting the final baseline from the number of UVs to the website.

Responsive to a determination that the calculated lift is not within a threshold of the prior lift, the process further includes setting the calculated lift as the prior lift and iteratively performing the adjusting, the fitting, the computing, and the comparing until the prior lift and the calculated lift are consistent. In some embodiments, the process further includes determining, utilizing the calculated lift consistent with the prior lift, a performance metric relating to the TV spot airing on the offline medium and presenting, through a user interface, the performance metric on a display.

One embodiment may comprise a system having a processor and a memory and configured to implement the SCI process disclosed herein. One embodiment may comprise a computer program product that comprises a non-transitory computer-readable storage medium which stores computer instructions that are executable by a processor to perform the SCI process disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 7 is a plot diagram showing effects of different baselining approaches.

FIG. 8 is a bar graph showing different UV lifts computed for each spot based on the different baselining approaches illustrated in FIG. 7.

FIG. 9 is a diagrammatical representation of a user interface showing a report with various performance metrics determined utilizing the SCI baselining approach disclosed herein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
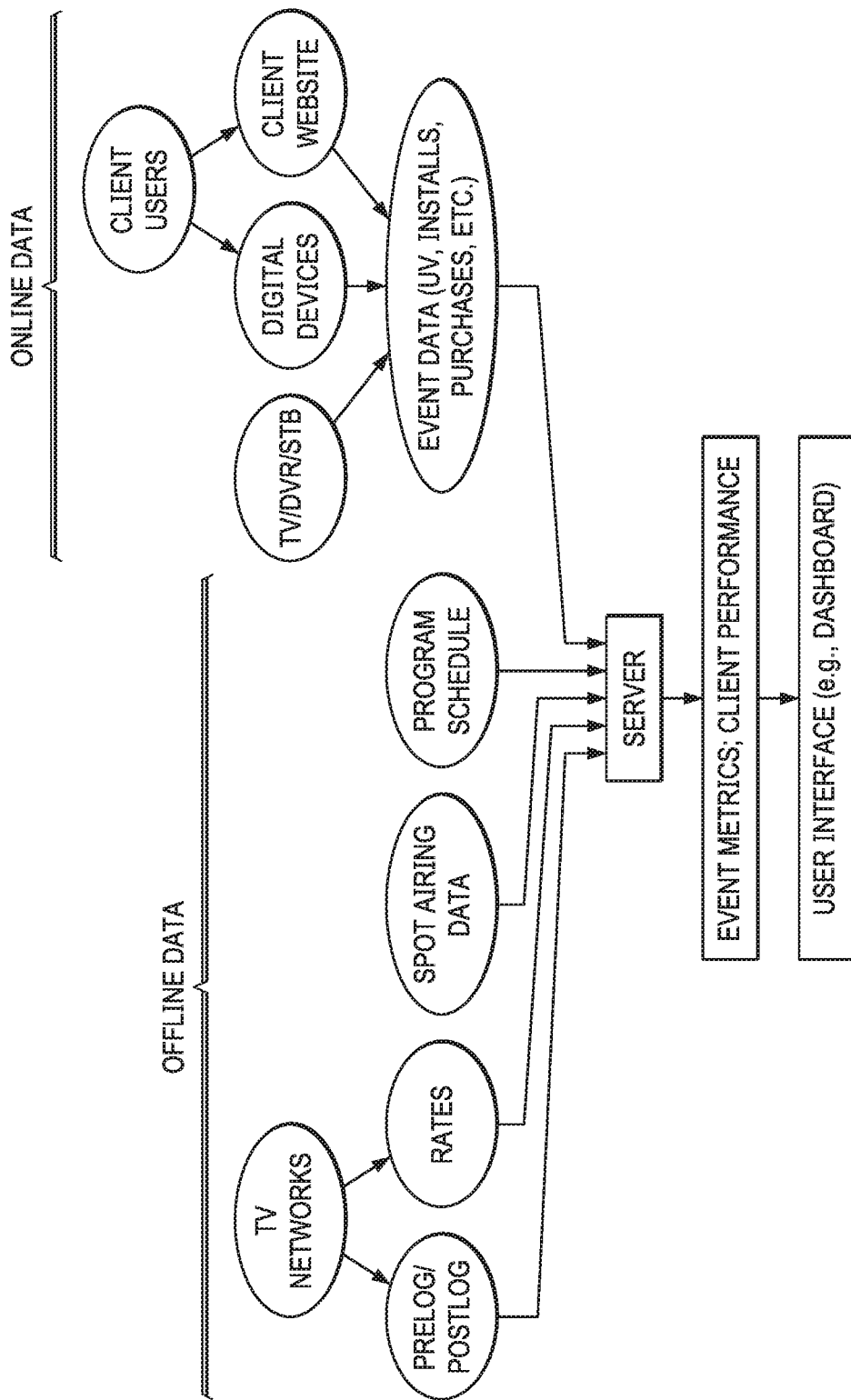
FIG. 1 depicts a diagrammatic representation of a network environment in which embodiments disclosed herein can be implemented.

As alluded to above, the Self-Consistent Inception (SCI) baselining approach disclosed herein incorporates online data and offline data from multiple data sources, including website traffic data, software download data, TV advertising data (e.g., when a spot airs on which network and how much it costs), and so on. As illustrated in FIG. 1, there is a natural distinction between online data and offline data.

For instance, data aggregated and/or provided by online and offline data sources can have very different data types. When a TV commercial (which is an example of a media creative) is presented to an audience through an online medium (e.g., a website or a mobile application acting as an advertising channel), the online medium can be an effective tool for a server that is programmed to compute the performance efficiency of that TV commercial. This is because the audience (i.e., potential consumers of a product or service offered by the TV commercial) is already accessing the Internet through the website or the mobile application. When a user is attracted to or interested in the product or service and visits the website or uses the mobile application to access the product or service, there is a session associated with that advertising channel. Thus, whether such a session results in a sale (or conversion) is a relatively straightforward process that can be done through tracking the session at the website or the mobile application (e.g., using a tracking pixel embedded in a page or pages that sends data to a server computer hosting the website or one that is associated with an entity offering the product or service).

The offline medium (e.g., linear TV), on the other hand, aims to drive potential consumers first to the Internet and then to a website or application where a product or service is offered. Unlike the online medium, there is neither session tracking nor a direct relationship between the offline medium and the desired result. Without digital evidence collected from TV viewers and TV networks, it is not possible to directly assess the performance efficiency of a media creative. This disconnect makes it extremely difficult to truly measure the performance of a media creative.

Figure 2:
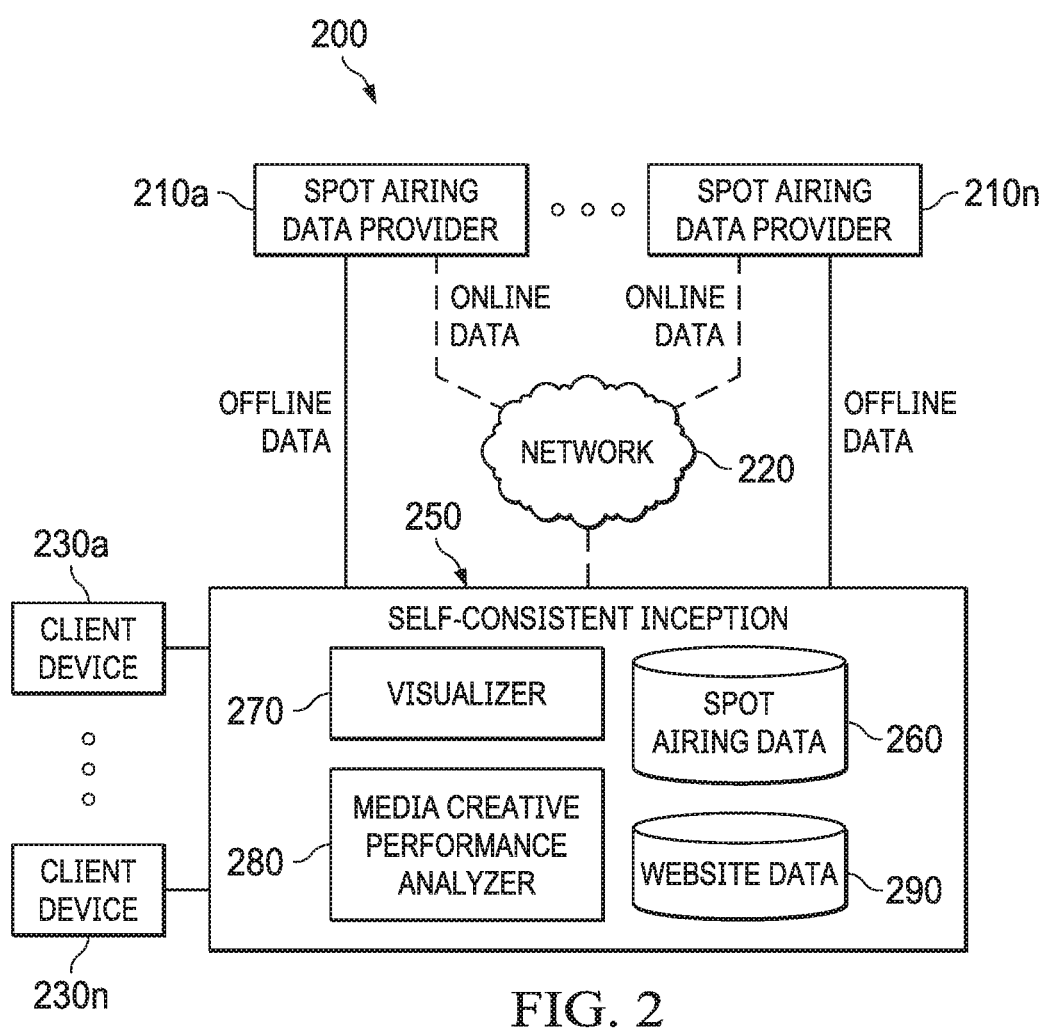
FIG. 2 depicts a diagrammatic representation of a Self-Consistent Inception (SCI) system operating in a network environment according to some embodiments.

To this end, FIG. 2 shows SCI system 250 communicatively connected to spot airing data providers 210a . . . 210n through analog communication channels (e.g., telephones, mail, couriers, etc.) and also to spot airing data providers 210a . . . 210n over network 220 (e.g., Internet) in network environment 200. Examples of spot airing data providers 210a . . . 210n can include TV networks, media agencies, third-party data providers such as a market research firm, etc.

In some embodiments, SCI system 250 may be implemented on one or more server machines operated by a media performance analytics service provider. In some embodiments, SCI system 250 can reside on a cloud-based server operating in a cloud computing environment.

The media performance analytics service provider may purchase spots from TV networks to air media creatives. The media performance analytics service provider may provide SCI system 250 with access to ad spend information which, in turn, enables SCI system 250 to compute efficiency for each media creative per each network. Additionally or alternatively, spot airing data providers 210a . . . 210n can provide online data and/or offline data, as exemplified in FIG. 1. Examples of offline data can include spot airing logs (before and after spots have aired) and rates from TV networks, spot airing data, program schedules, etc.

Spot airing data generally includes what and when spots aired and on what network. Often there is not a uniform format of spot airing data received or obtained from spot airing data providers 210a . . . 210n. SCI system 250 is operable to uniquely identify and store spot airing data per each instance of a spot airing on a particular network at a particular time in spot airing data database 260. In one embodiment, SCI system 250 is operable to perform, where necessary, data cleansing operations such as deduplication, normalization, data format conversion, etc. Likewise, SCI system 250 is operable to store online data in website data database 290. Examples of online data can include website data for a particular website, including the number of UVs visiting the website at a given time, the number of installations ("installs") by website visitors, the number of purchases made at the website, etc.

In the example of FIG. 2, SCI system 250 further includes media creative performance analyzer 280 and visualizer 270. As described below, media creative performance analyzer 280 is configured for determining an accurate baseline utilizing the SCI baselining approach disclosed herein. The baseline thus determined by media creative performance analyzer 280 can be utilized to determine various media creative performance metrics for presentation on, e.g., on client devices 230a . . . 230n through a user interface (UI) generated by visualizer 270. In some embodiments, visualizer 270 is adapted for generating various visualizations particularly useful for decision making purposes.

Figure 3A:
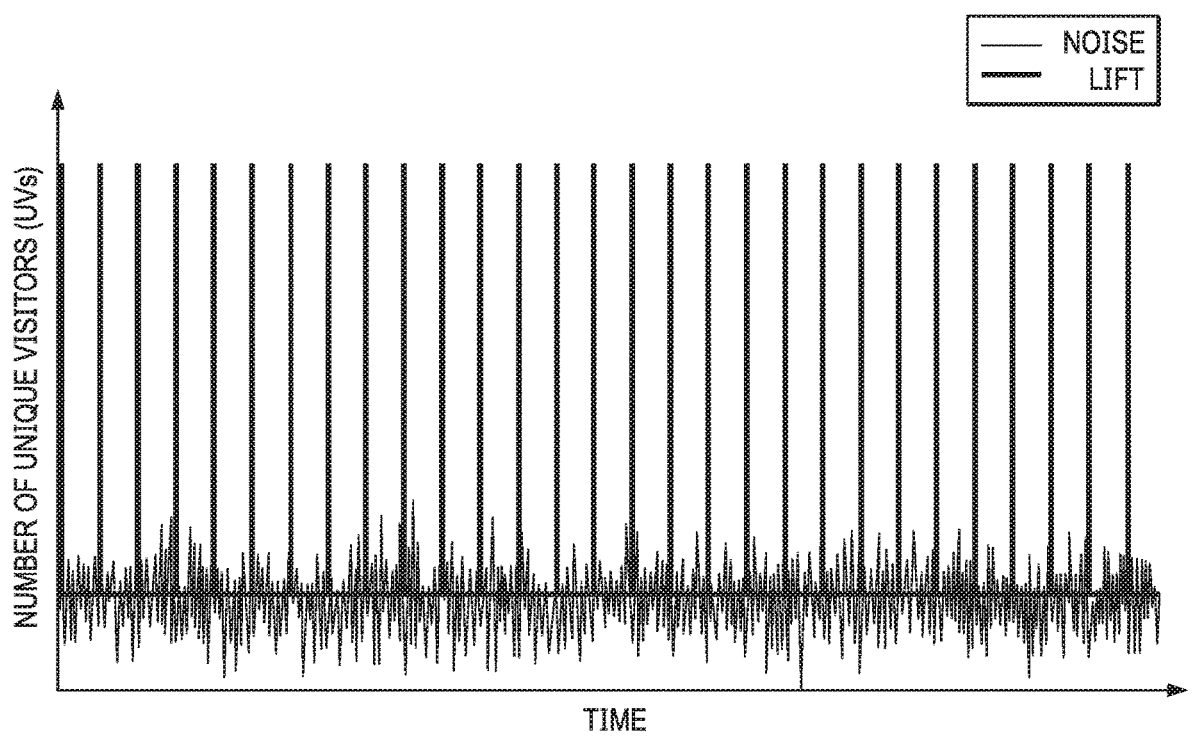
FIG. 3A illustrates an example of a plot diagram showing raw unique visitor (UV) data with periodic UV spikes occurring at a website over time.
Figure 3B:
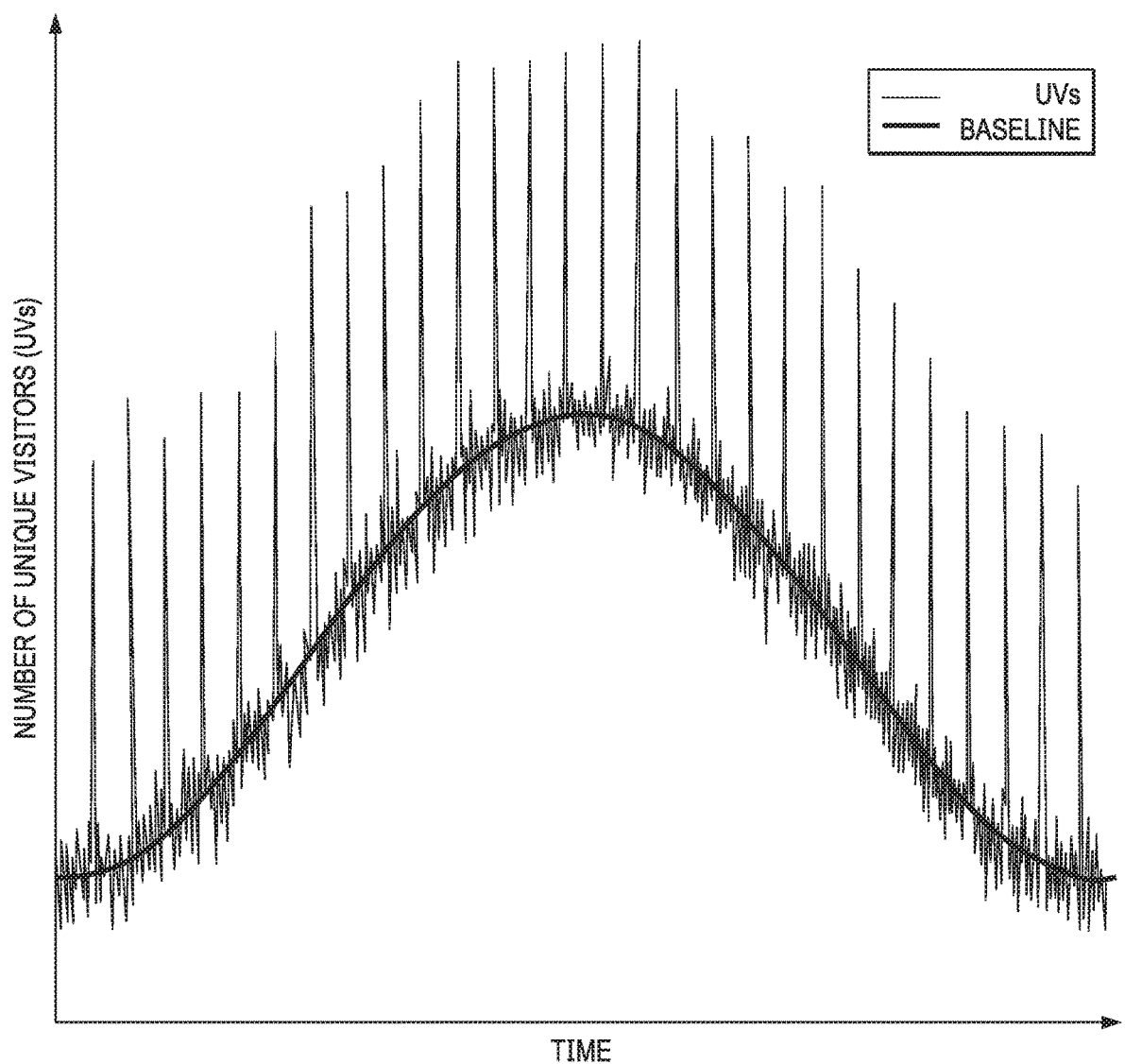
FIG. 3B illustrates an example in which a baseline is deduced from the raw UV curve of FIG. 3A with no lift subtracted and with a smoothing function applied to generate a smoothed version of the baseline.

FIG. 3A illustrates an example of a plot diagram showing raw UVs (with periodic UV spikes) to a website over time. FIG. 3B illustrates an example in which a baseline is deduced or otherwise generated from the raw UV curve with no lift subtracted, although a smoothing function is applied in this example to generate a smoothed version of the baseline.

In some cases, the following constraints apply when considering real lift from TV ad spots: lift can only be positive and immediate lift from one TV spot/feed should only span a short duration, for instance, around 5 minutes.

Several methods exist that can be used to deduce a smoothed baseline from a raw UV curve (no lift subtracted). These methods, explained below, include rolling mean (moving averages), rolling median, and Locally Weighted Scatterplot Smoothing (LOWESS).

Rolling Mean

Figure 4A:
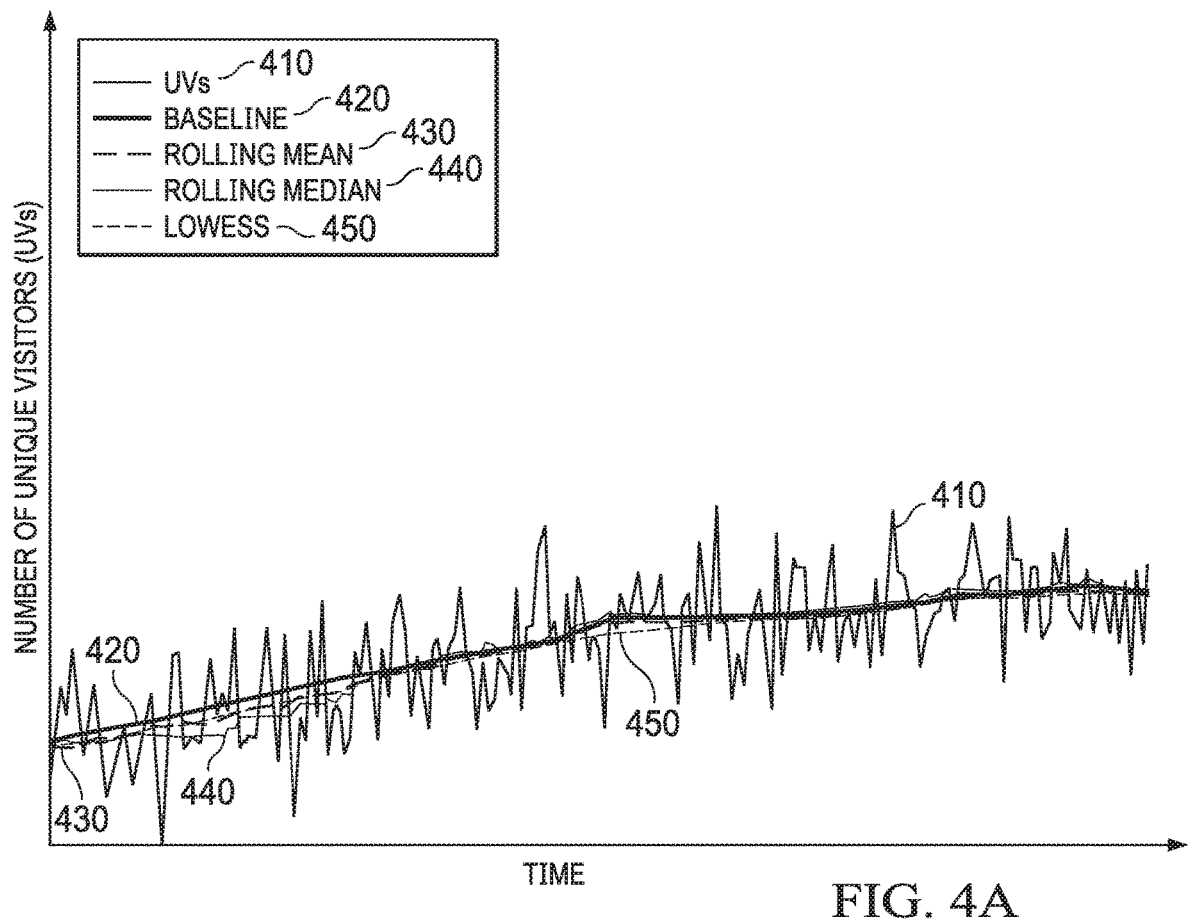
FIGS. 4A-4D show examples of overestimation effects of various baselining approaches.
Figure 4B:
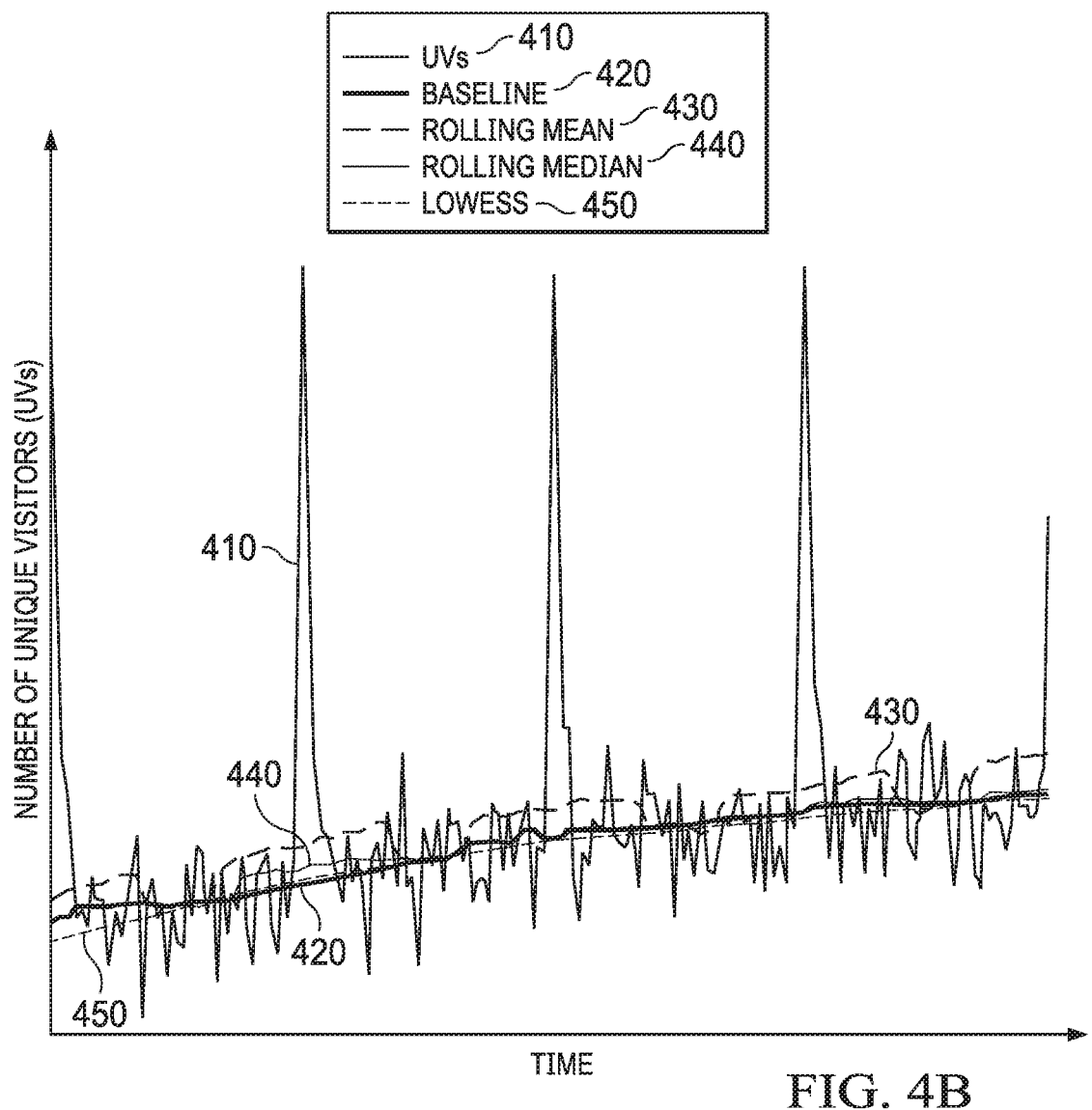
Figure 4C:
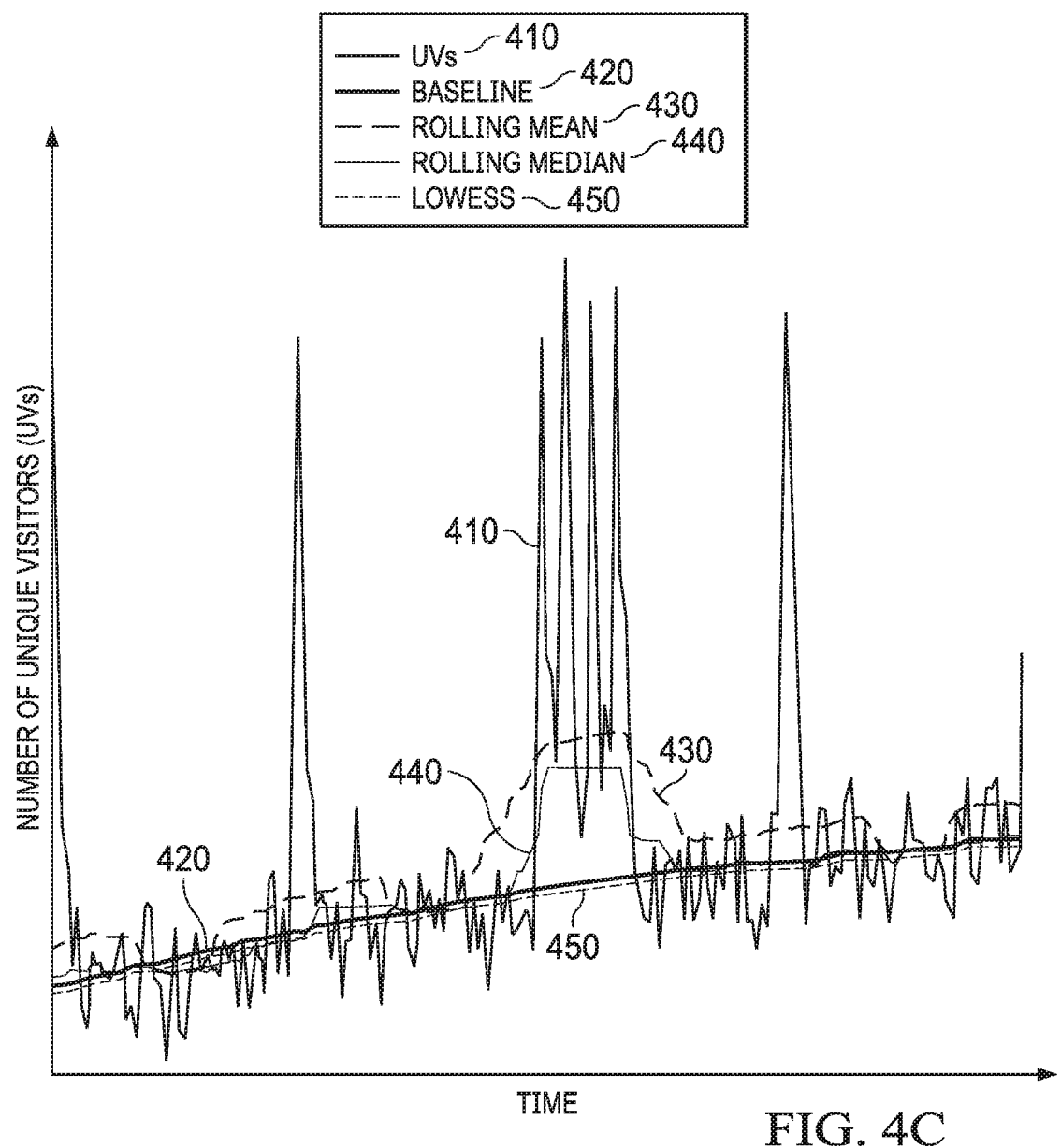
Figure 4D:
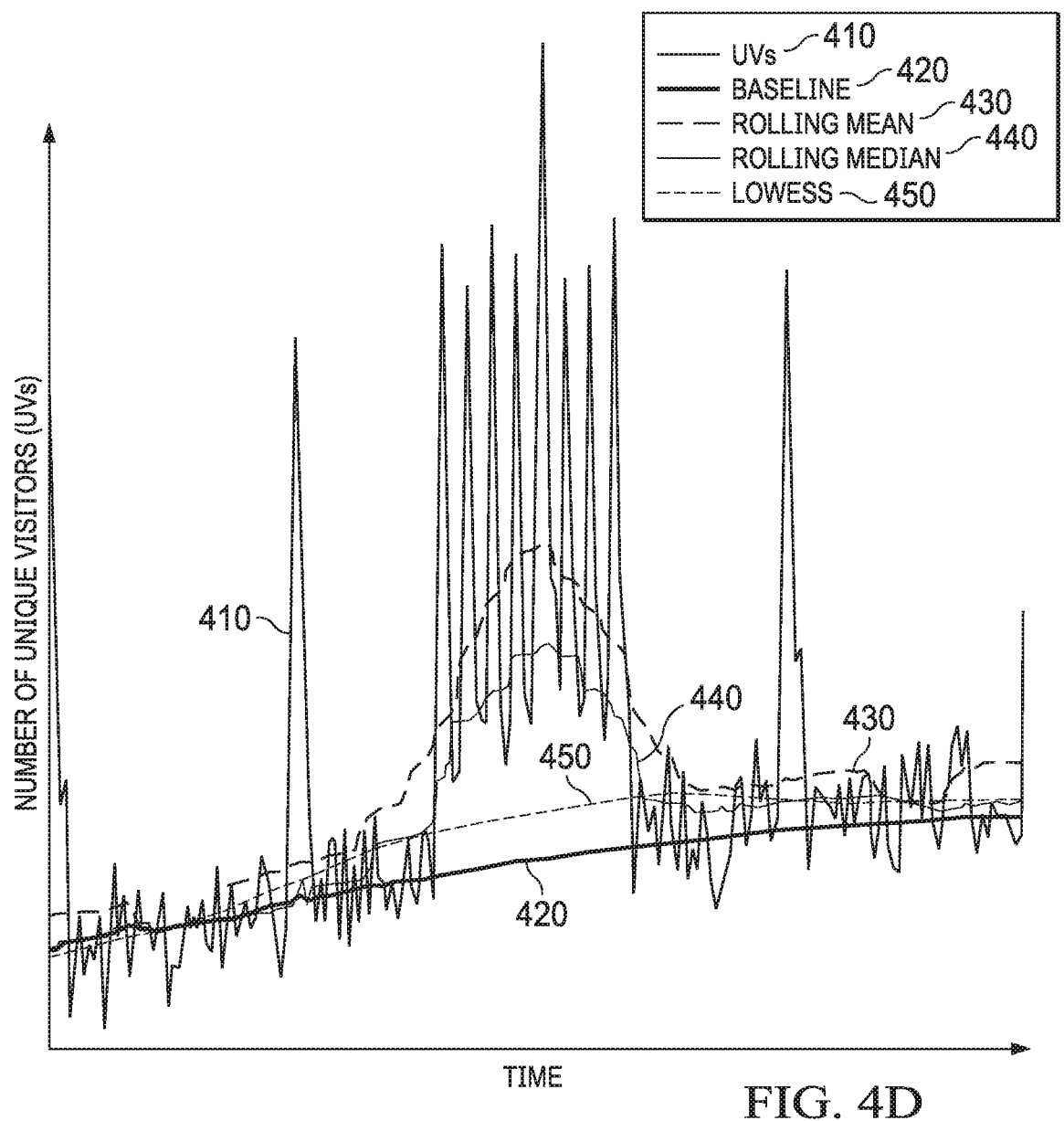

In statistics, rolling means (or moving averages or moving means) are generally used to smooth out short-term fluctuations in time series data and highlight long-term trends. While the rolling mean method can smooth out the lift into a wider range of minutes, the fact that lift is always positive means that the rolling mean will always bring up the smoothed curve, overestimating the baseline. FIGS. 4A-4D show examples of the overestimation effects of various baselining approaches. In FIGS. 4A-4D, each of rolling mean method baseline 430, rolling median method baseline 440, and LOWESS method baseline 450 is deduced from raw UV curve 410. For purpose of comparison, each of FIGS. 4A-4D also shows reference baseline 420 (which is artificially set as a goal and used as a reference for performance analysis purposes). In FIG. 4A, no UV spikes attributable to TV spots occurred within the time window for which raw UV curve 410 is visualized. FIG. 4B shows sparse UV spikes attributable to TV spots. FIG. 4C shows mildly dense UV spikes attributable to TV spots. FIG. 4D shows heavily dense UV spikes attributable to TV spots. As FIGS. 4A-4D illustrate, the denser the TV spots (as reflected in the UV spikes), the worse the overestimation effects, particularly the rolling mean method, in deducing a baseline from UV curve 410.

Rolling Median

The rolling median method does not suffer from the same problems as the rolling mean method because the median is more resistant to outliers (e.g., a lift from TV spots can be considered an outlier here) and the immediate lift only spans a short duration. As long as an appropriate rolling window size is used, the rolling median method should work relatively well in deducing a baseline from a raw UV curve with sparsely spaced TV spots. However, when there are multiple UV spikes occurring relatively close to one another within the rolling window (possibly caused by TV spots airing at the same time and/or relatively close to each other), the performance of the rolling median approach begins to suffer. As discussed above, FIGS. 4A-4D also show examples of how the performance of the rolling median method 440 in deducing a baseline from a UV curve deteriorates as UV spikes increase in density. As illustrated in FIGS. 4A-4D, while the rolling median method 440 generally performs better than the rolling mean approach 430, it suffers from a similar decline in performance when UV spikes are denser and the denser the TV spots (as reflected in the UV spikes), the worse the output (a baseline) deduced from the UV curve using the rolling median method 440.

LOWESS

The LOWESS method is a robust locally weighted regression method that is performed to the k nearest neighbors (k-NN) for each one of the data points. The weights for each neighbor are affected by two factors: the closeness to the data point in question and their deviation from others. The LOWESS method overcomes the asymmetric outlier problem in which lift is always positive by assigning low weights to outliers: the more the points are deviant from others, the lower they are weighted when the regressions are performed. Intuitively, small k will result in very adaptive smoothing, at times too volatile to appropriately capture large scale trends while a large k makes the smoothing rigid, incapable to catch somewhat local variations. Picking an optimal k is key to the algorithm performance.

In practice, the LOWESS method performs relatively well when TV spot airings are mildly dense. This is illustrated in FIGS. 4A-4C. However, when TV spot airings become so dense that even the highly trained human eyes have difficulty in figuring out the actual smoothed baseline, the LOWESS method 450 alone cannot deduce an accurate baseline. In these cases, the spikes are much shallower due to the convolution of the base of the spikes, which, if extracted from the context of a region of heavy TV spot airings, behave the same as a lifted UV level, causing the baseline to be overestimated, as illustrated in FIG. 4D.

As discussed above, a baseline is a UV curve without the lift, and the lift, in turn, is the remaining number of UVs with baseline subtracted. While the LOWESS method (which is a non-parametric method) can be used to produce a smoothed version of a baseline without having to calculate the lift first, some problems remain. For example, it is difficult to find an optimal parameter (k) for UVs that has both mild and steep variations. Further, the LOWESS method tends to overestimate the baseline in heavy TV spot airing regions.

The new SCI method disclosed herein can overcome these and other problems. The SCI method incorporates the TV spot airing data (e.g., time and spend) and implements a new architecture with an iterative nature.

SCI Methodology

LOWESS Algorithm

In some embodiments, the LOWESS algorithm is used as a building block for the SCI approach. Other SCI elements are built around LOWESS to address the problems discussed above that are associated with the LOWESS approach. The inception architecture described below enhances the LOWESS approach so that it can work for UV curves with very different levels of variations, while the self-consistent approach aims at making sure that a baseline can be deduced from a non-lifted UV curve.

Inception Architecture

When the LOWESS algorithm is used alone, a systematic error for the LOWESS algorithm can be observed under big second-order derivative change areas. In some embodiments, using a detrending approach can ameliorate such a behavior. While the detrending calculation usually requires using the previous 7-14 days UV profile, it is considered harder to implement based on the current setting.

To this end, a LOWESS over LOWESS method is applied to approximate detrending result. An extension of this method entails continuously using LOWESS to fit the residual response, until the final LOWESS baseline converges to a constant line (0). The "inception" architecture is so named from the movie "Inception" where one goes into the dream of his dream.

Self-Consistent Approach

In a LOWESS-only baseline calculation, strong overfitting can be observed over a heavily aired time-period. A "filtering" approach can be used to remove and interpolate the response within 5-minute airings. However, this "filtering" process will cause instability problems when the airings are low-spend high-frequency. This is because, after the "filtering" process, only a few data points are available for the baseline calculation and fewer data points tend to create heavy overfitting (overestimation).

Figure 5:
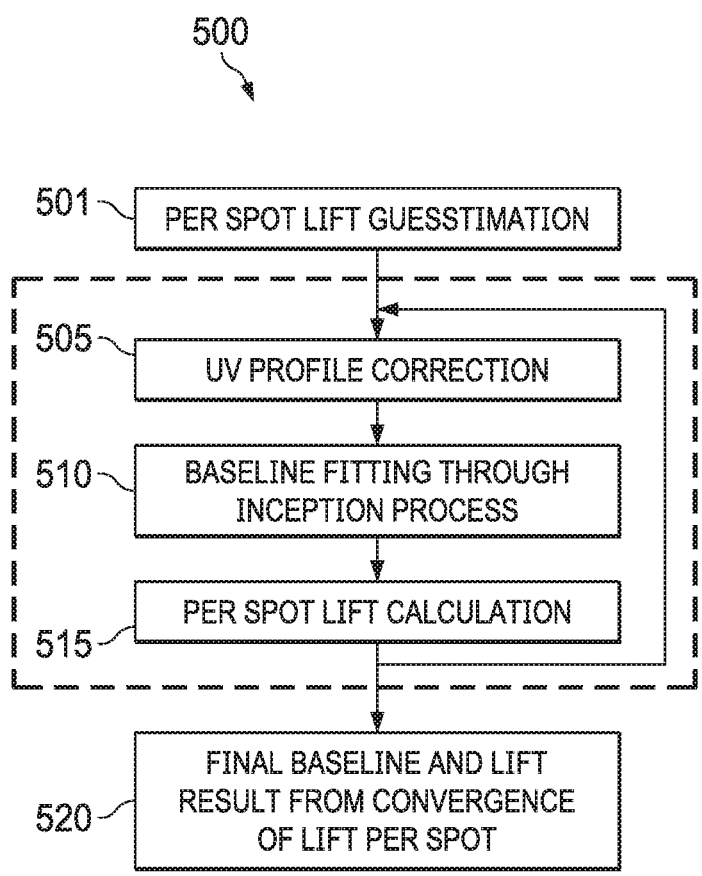
FIG. 5 is a flow diagram showing a new SCI baselining approach according to embodiments disclosed herein.

Referring to FIG. 5, in some embodiments, a "self-consistent" approach can resolve the above-mentioned issue of the "filtering" approach. In some embodiments, "self-consistent" process 500 begins with an initial estimate for each spot's lift (501), uses the estimated lift to adjust the response profile (505), fits a baseline through the above-described inception process (510), then calculates a lift for each TV spot based on this baseline (515). Generally, for each media creative (e.g., a TV spot) aired, there is a tell-tale temporal response pattern or UV changes observable from the website traffic data. This temporal pattern or temporal fingerprint is referred to herein a response profile. The response profile includes the number of UVs on a minute-by-minute basis within a time window (e.g., five minutes). Such a response profile can be a portion of a UV curve within a time window after the airing of a media creative.

If the calculated lift is different from the initial guess (i.e., the estimated lift), the "self-consistent" process loops back and adjusts the initial guess (505), and then refits the baseline (510) and recalculates the lift per spot (515), until finally the iterated estimate and the calculated lift are consistent (520). The convergence of the estimated lift per spot (505) and the calculated lift per spot (515) validates the baseline calculated through the inception process (510), which becomes the final baseline output from "self-consistent" process 500.

FIGS. 6A-6D are plot diagrams showing example UV line 610, reference baseline 620, adjusted UV line 615, and iterations 630, 640, 650, and 660 of a SCI process. FIG. 6E is a plot diagram showing outputs from iterations 630, 640, 650, and 660. As illustrated in FIG. 6E, after several iterations, output baseline 660 is very close to reference baseline 620, even though heavily dense TV airings were present in the time window, causing heavily dense UV spikes in raw UV line 610. This shows that the "self-consistent" approach performs better than the existing methods described above and can solve the problems particular to deducing an accurate baseline from raw UVs subject to dense UV spikes that tend to occur when TV spot airings are close to each other.

Numerical Example:

Step 501—Assume a global Cost Per Visitor (CPV, e.g. $4/visitor) in a time window and calculate how much lift each spot generates, as shown in Table 1 below. This lift is used as a Bayesian prior.

TABLE 1

| Minute | Initial CPV Spend | $4.00 Initial: Lift |
|---|---|---|
| 2018-10-01 9:10:00 | 200 | 50.0 |
| 2018-10-01 9:40:00 | 200 | 50.0 |
| 2018-10-01 9:45:00 | 200 | 50.0 |
| 2018-10-01 9:50:00 | 200 | 50.0 |
| 2018-10-01 9:55:00 | 200 | 50.0 |
| 2018-10-01 10:00:00 | 200 | 50.0 |
| 2018-10-01 10:00:00 | 200 | 50.0 |
| 2018-10-01 10:05:00 | 200 | 50.0 |
| 2018-10-01 10:10:00 | 200 | 50.0 |
| 2018-10-01 10:15:00 | 200 | 50.0 |
| 2018-10-01 10:50:00 | 200 | 50.0 |
| 2018-10-01 11:40:00 | 200 | 50.0 |

Figure 6A:
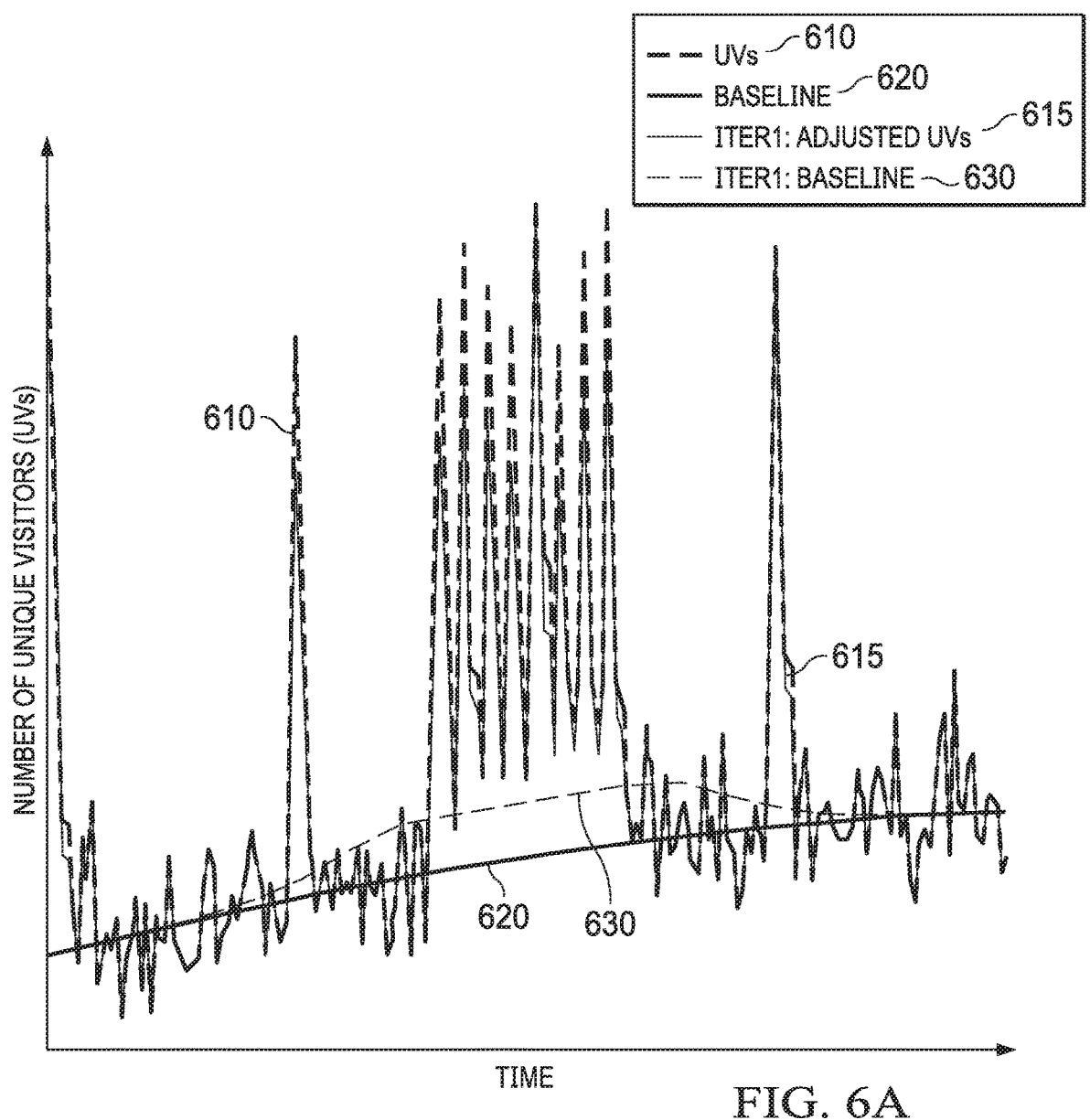
FIGS. 6A-6D are plot diagrams showing example iterations of the baselining approach of FIG. 5
Figure 6B:
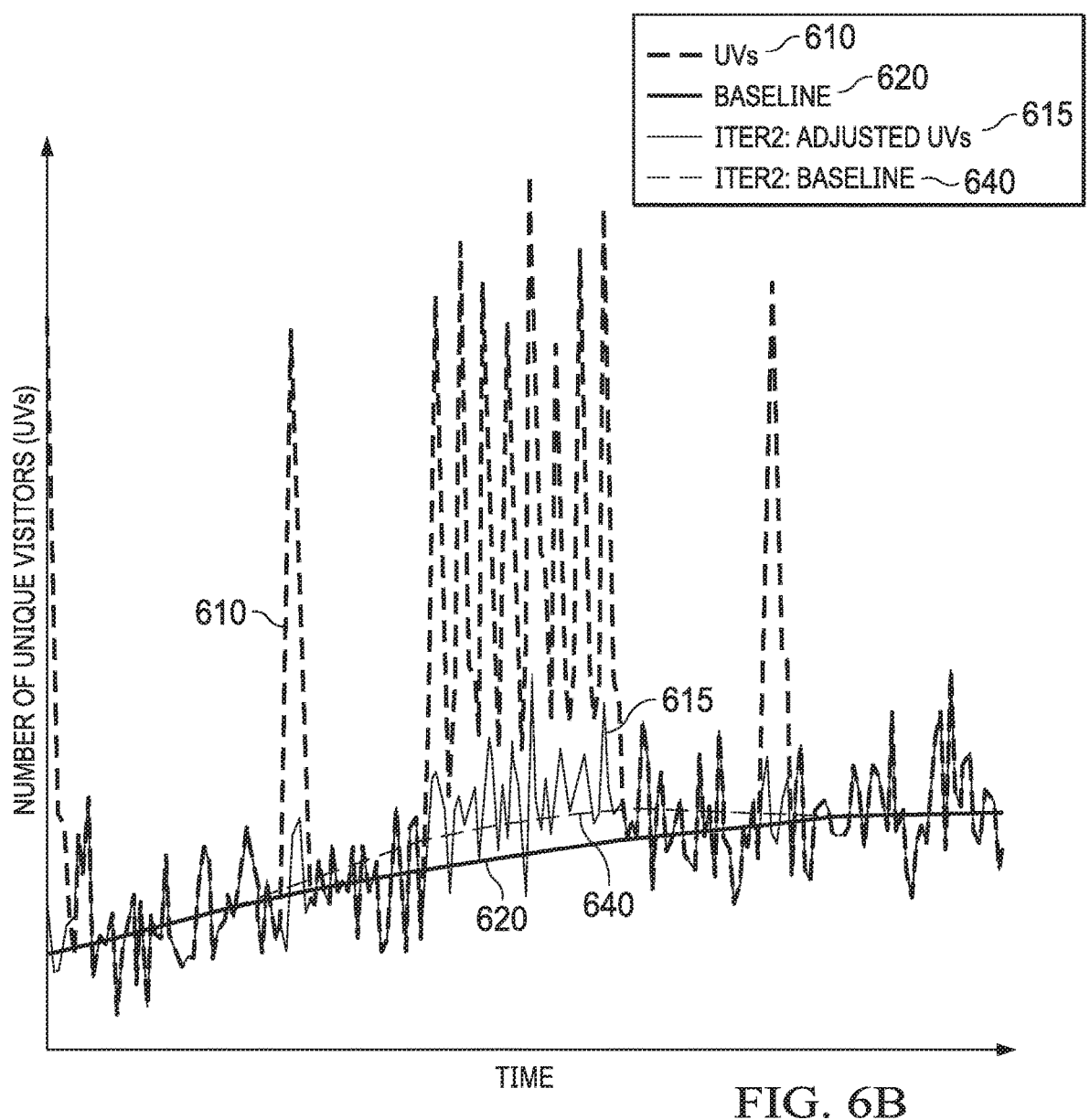
Figure 6C:
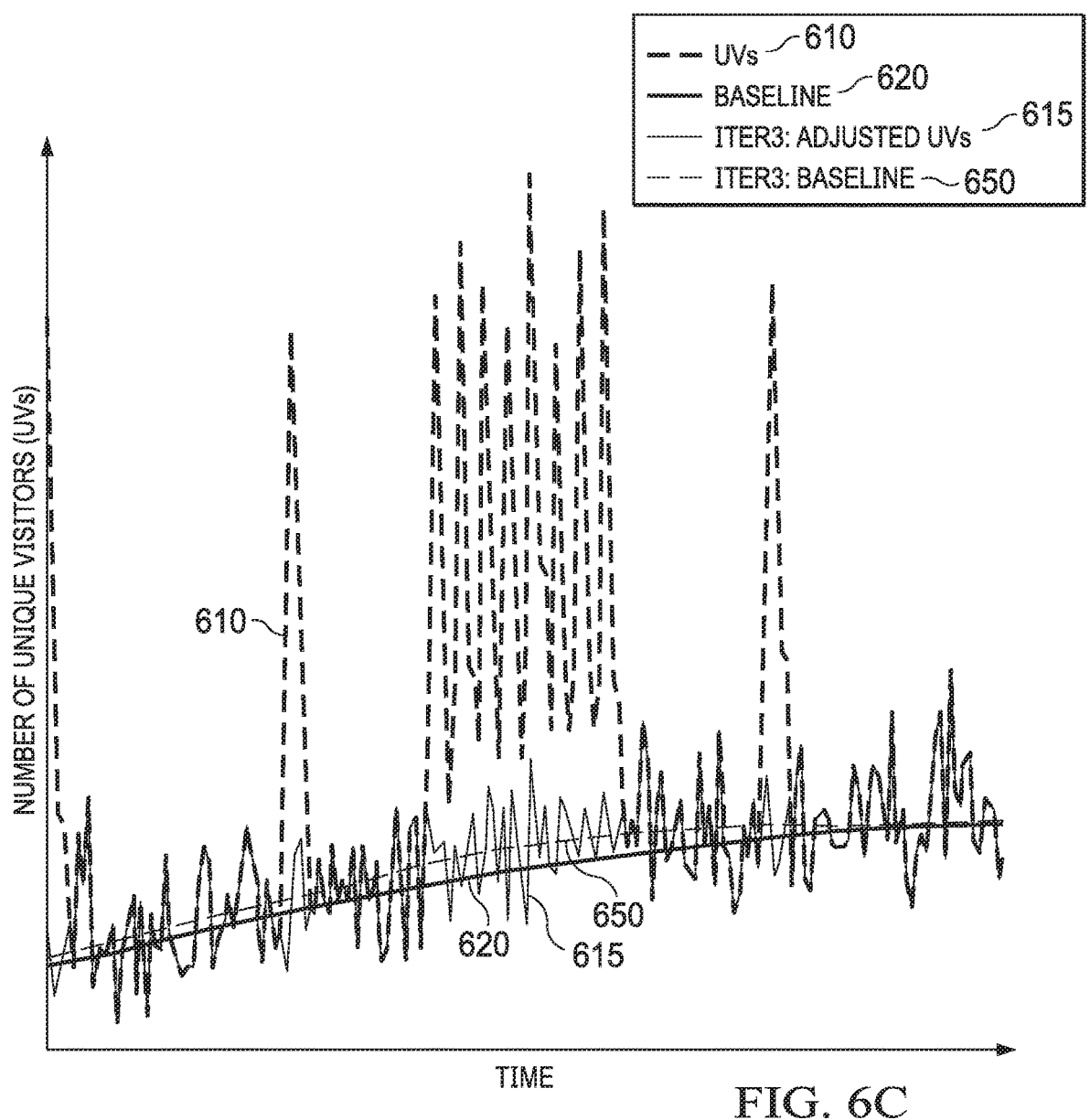
Figure 6D:
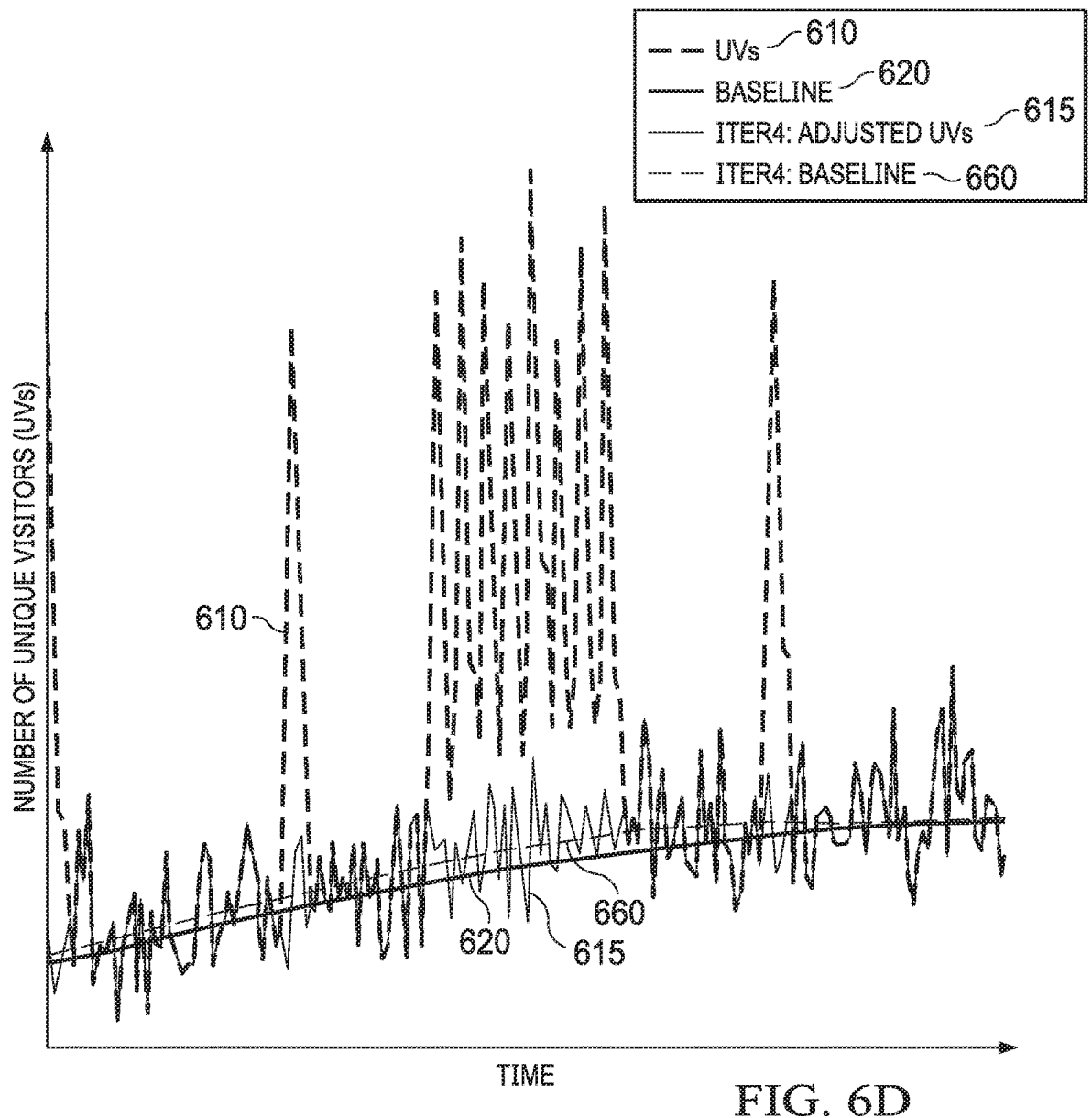
Figure 6E:
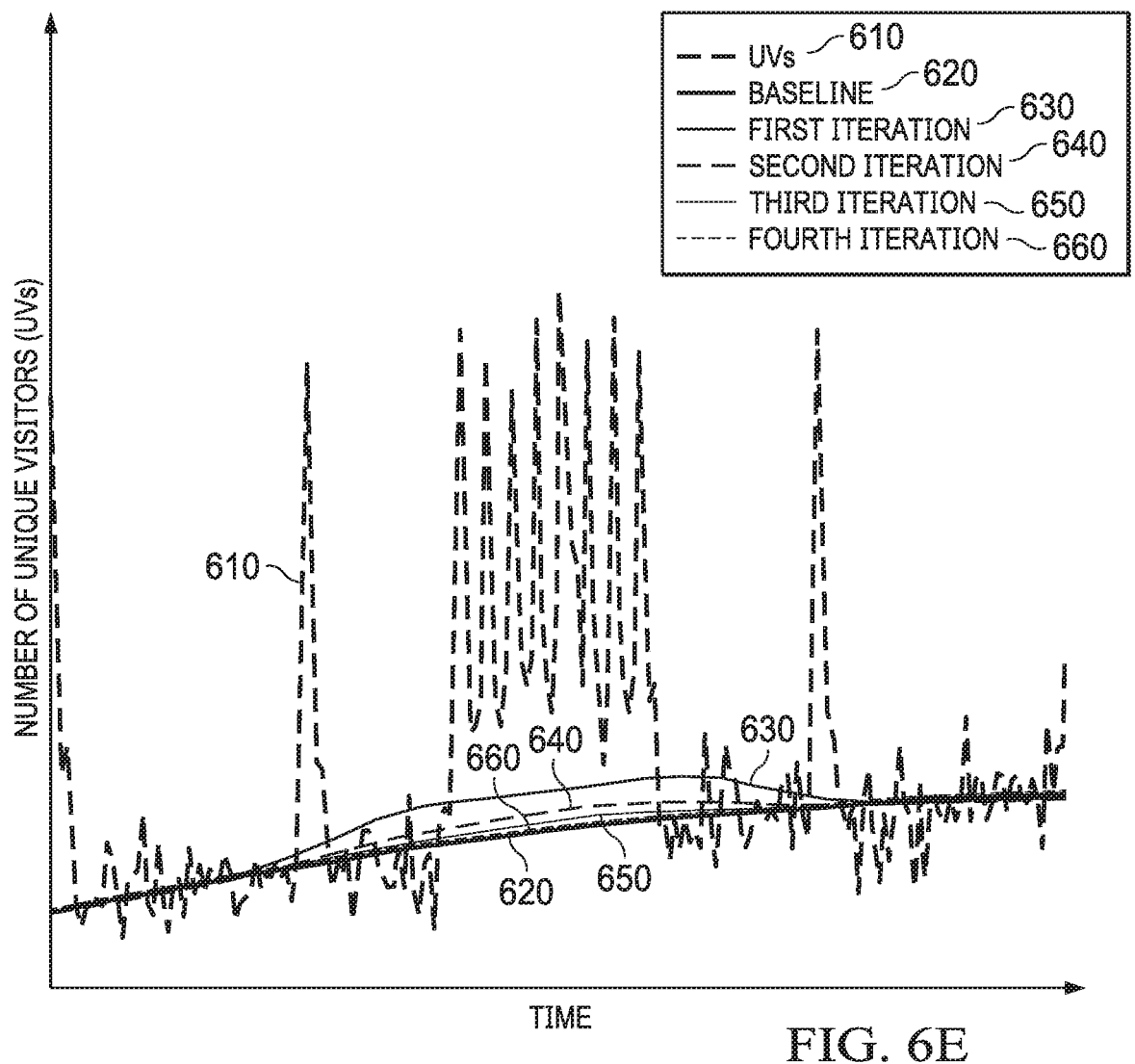
FIG. 6E is a plot diagram showing outputs from the iterations.

Step 505—This lift prior is used to "correct" the actual UV curve by being subtracted from it, as illustrated in FIG. 6A. The lift is distributed to the n (e.g., 5) minutes within the airing time. The distributed lift is subtracted from the UV to get an adjusted UV, as shown in Table 2 below.

TABLE 2

| Minute | UVs | iter1: adjusted UVs | iter1: baseline | iter1: minutely lift |
|---|---|---|---|---|
| 2018-10-01 8:40:00 | 94 | 94 | 91.8 | 2.2 |
| 2018-10-01 8:41:00 | 101 | 101 | 92 | 9 |
| 2018-10-01 8:42:00 | 92 | 92 | 92.2 | −0.2 |
| 2018-10-01 8:43:00 | 95 | 95 | 92.4 | 2.6 |
| 2018-10-01 8:44:00 | 88 | 88 | 92.6 | −4.6 |
| 2018-10-01 8:45:00 | 107 | 107 | 92.8 | 14.2 |
| 2018-10-01 8:46:00 | 95 | 95 | 93 | 2 |
| 2018-10-01 8:47:00 | 94 | 94 | 93.2 | 0.8 |
| 2018-10-01 8:48:00 | 95 | 95 | 93.4 | 1.6 |
| 2018-10-01 8:49:00 | 89 | 89 | 93.7 | −4.7 |
| 2018-10-01 8:50:00 | 96 | 96 | 93.9 | 2.1 |
| 2018-10-01 8:51:00 | 96 | 96 | 94.1 | 1.9 |
| 2018-10-01 8:52:00 | 96 | 96 | 94.4 | 1.6 |
| 2018-10-01 8:53:00 | 92 | 92 | 94.6 | −2.6 |
| 2018-10-01 8:54:00 | 97 | 97 | 94.8 | 2.2 |
| 2018-10-01 8:55:00 | 94 | 94 | 95.1 | −1.1 |
| 2018-10-01 8:56:00 | 95 | 95 | 95.3 | −0.3 |
| 2018-10-01 8:57:00 | 87 | 87 | 95.6 | −8.6 |
| 2018-10-01 8:58:00 | 91 | 91 | 95.9 | −4.9 |
| 2018-10-01 8:59:00 | 97 | 97 | 96.1 | 0.9 |
| 2018-10-01 9:00:00 | 100 | 100 | 96.4 | 3.6 |
| 2018-10-01 9:01:00 | 89 | 89 | 96.7 | −7.7 |
| 2018-10-01 9:02:00 | 91 | 91 | 97 | −6 |
| 2018-10-01 9:03:00 | 100 | 100 | 97.3 | 2.7 |
| 2018-10-01 9:04:00 | 98 | 98 | 97.6 | 0.4 |
| 2018-10-01 9:05:00 | 105 | 105 | 97.9 | 7.1 |
| 2018-10-01 9:06:00 | 92 | 92 | 98.2 | −6.2 |
| 2018-10-01 9:07:00 | 102 | 102 | 98.5 | 3.5 |
| 2018-10-01 9:08:00 | 91 | 91 | 98.8 | −7.8 |
| 2018-10-01 9:09:00 | 103 | 103 | 99.2 | 3.8 |
| 2018-10-01 9:10:00 | 113 | 107.4 | 99.5 | 13.5 |
| 2018-10-01 9:11:00 | 187 | 165 | 99.9 | 87.1 |
| 2018-10-01 9:12:00 | 146 | 134.5 | 100.2 | 45.8 |
| 2018-10-01 9:13:00 | 120 | 114.2 | 100.6 | 19.4 |
| 2018-10-01 9:14:00 | 116 | 111.5 | 100.9 | 15.1 |
| 2018-10-01 9:15:00 | 100 | 100 | 101.3 | −1.3 |
| 2018-10-01 9:16:00 | 102 | 102 | 101.7 | 0.3 |
| 2018-10-01 9:17:00 | 101 | 101 | 102.1 | −1.1 |
| 2018-10-01 9:18:00 | 99 | 99 | 102.4 | −3.4 |
| 2018-10-01 9:19:00 | 91 | 91 | 102.8 | −11.8 |
| 2018-10-01 9:20:00 | 91 | 91 | 103.2 | −12.2 |
| 2018-10-01 9:21:00 | 98 | 98 | 103.5 | −5.5 |
| 2018-10-01 9:22:00 | 106 | 106 | 103.9 | 2.1 |
| 2018-10-01 9:23:00 | 92 | 92 | 104.2 | −12.2 |
| 2018-10-01 9:24:00 | 104 | 104 | 104.6 | −0.6 |
| 2018-10-01 9:25:00 | 96 | 96 | 104.9 | −8.9 |
| 2018-10-01 9:26:00 | 95 | 95 | 105.2 | −10.2 |
| 2018-10-01 9:27:00 | 102 | 102 | 105.5 | −3.5 |
| 2018-10-01 9:28:00 | 95 | 95 | 105.8 | −10.8 |
| 2018-10-01 9:29:00 | 107 | 107 | 106.1 | 0.9 |
| 2018-10-01 9:30:00 | 101 | 101 | 106.3 | −5.3 |
| 2018-10-01 9:31:00 | 107 | 107 | 106.6 | 0.4 |
| 2018-10-01 9:32:00 | 101 | 101 | 106.8 | −5.8 |
| 2018-10-01 9:33:00 | 100 | 100 | 107 | −7 |
| 2018-10-01 9:34:00 | 99 | 99 | 107.2 | −8.2 |
| 2018-10-01 9:35:00 | 103 | 103 | 107.4 | −4.4 |
| 2018-10-01 9:36:00 | 102 | 102 | 107.5 | −5.5 |
| 2018-10-01 9:37:00 | 95 | 95 | 107.7 | −12.7 |
| 2018-10-01 9:38:00 | 100 | 100 | 107.8 | −7.8 |
| 2018-10-01 9:39:00 | 106 | 106 | 107.9 | −1.9 |
| 2018-10-01 9:40:00 | 132 | 126.5 | 108.1 | 23.9 |
| 2018-10-01 9:41:00 | 190 | 168.1 | 108.2 | 81.8 |
| 2018-10-01 9:42:00 | 153 | 141.5 | 108.3 | 44.7 |
| 2018-10-01 9:43:00 | 132 | 126.2 | 108.4 | 23.6 |
| 2018-10-01 9:44:00 | 112 | 107.5 | 108.5 | 3.5 |
| 2018-10-01 9:45:00 | 123 | 117.5 | 108.6 | 14.4 |
| 2018-10-01 9:46:00 | 189 | 167.1 | 108.7 | 80.3 |
| 2018-10-01 9:47:00 | 141 | 129.5 | 108.8 | 32.2 |
| 2018-10-01 9:48:00 | 120 | 114.2 | 108.9 | 11.1 |
| 2018-10-01 9:49:00 | 130 | 125.5 | 109 | 21 |
| 2018-10-01 9:50:00 | 118 | 112.5 | 109.1 | 8.9 |
| 2018-10-01 9:51:00 | 192 | 170.1 | 109.2 | 82.8 |
| 2018-10-01 9:52:00 | 150 | 138.5 | 109.3 | 40.7 |
| 2018-10-01 9:53:00 | 122 | 116.2 | 109.4 | 12.6 |
| 2018-10-01 9:54:00 | 125 | 120.5 | 109.5 | 15.5 |
| 2018-10-01 9:55:00 | 119 | 113.5 | 109.6 | 9.4 |
| 2018-10-01 9:56:00 | 189 | 167.1 | 109.7 | 79.3 |
| 2018-10-01 9:57:00 | 153 | 141.5 | 109.8 | 43.2 |
| 2018-10-01 9:58:00 | 124 | 118.2 | 109.9 | 14.1 |
| 2018-10-01 9:59:00 | 124 | 119.5 | 110 | 14 |
| 2018-10-01 10:00:00 | 158 | 146.8 | 110.1 | 47.9 |
| 2018-10-01 10:01:00 | 279 | 235 | 110.2 | 168.8 |
| 2018-10-01 10:02:00 | 204 | 180.9 | 110.3 | 93.7 |
| 2018-10-01 10:03:00 | 156 | 144.3 | 110.5 | 45.5 |
| 2018-10-01 10:04:00 | 139 | 129.9 | 110.6 | 28.4 |
| 2018-10-01 10:05:00 | 136 | 130.5 | 110.7 | 25.3 |
| 2018-10-01 10:06:00 | 186 | 164.1 | 110.8 | 75.2 |
| 2018-10-01 10:07:00 | 157 | 145.5 | 111 | 46 |
| 2018-10-01 10:08:00 | 127 | 121.2 | 111.1 | 15.9 |
| 2018-10-01 10:09:00 | 121 | 116.5 | 111.2 | 9.8 |
| 2018-10-01 10:10:00 | 126 | 120.5 | 111.3 | 14.7 |
| 2018-10-01 10:11:00 | 193 | 171.1 | 111.5 | 81.5 |
| 2018-10-01 10:12:00 | 158 | 146.5 | 111.6 | 46.4 |
| 2018-10-01 10:13:00 | 128 | 122.2 | 111.7 | 16.3 |
| 2018-10-01 10:14:00 | 119 | 114.5 | 111.9 | 7.1 |
| 2018-10-01 10:15:00 | 129 | 123.5 | 112 | 17 |
| 2018-10-01 10:16:00 | 196 | 174.1 | 112.1 | 83.9 |
| 2018-10-01 10:17:00 | 148 | 136.5 | 112.3 | 35.7 |
| 2018-10-01 10:18:00 | 137 | 131.2 | 112.4 | 24.6 |
| 2018-10-01 10:19:00 | 133 | 128.5 | 112.5 | 20.5 |
| 2018-10-01 10:20:00 | 111 | 111 | 112.6 | −1.6 |
| 2018-10-01 10:21:00 | 102 | 102 | 112.7 | −10.7 |
| 2018-10-01 10:22:00 | 101 | 101 | 112.8 | −11.8 |
| 2018-10-01 10:23:00 | 112 | 112 | 112.9 | −0.9 |
| 2018-10-01 10:24:00 | 114 | 114 | 113 | 1 |
| 2018-10-01 10:25:00 | 109 | 109 | 113 | −4 |
| 2018-10-01 10:26:00 | 103 | 103 | 113.1 | −10.1 |
| 2018-10-01 10:27:00 | 110 | 110 | 113.1 | −3.1 |
| 2018-10-01 10:28:00 | 109 | 109 | 113.2 | −4.2 |
| 2018-10-01 10:29:00 | 105 | 105 | 113.2 | −8.2 |
| 2018-10-01 10:30:00 | 102 | 102 | 113.1 | −11.1 |
| 2018-10-01 10:31:00 | 103 | 103 | 113.1 | −10.1 |
| 2018-10-01 10:32:00 | 104 | 104 | 113.1 | −9.1 |
| 2018-10-01 10:33:00 | 104 | 104 | 113 | −9 |
| 2018-10-01 10:34:00 | 101 | 101 | 112.9 | −11.9 |
| 2018-10-01 10:35:00 | 111 | 111 | 112.9 | −1.9 |
| 2018-10-01 10:36:00 | 116 | 116 | 112.8 | 3.2 |
| 2018-10-01 10:37:00 | 117 | 117 | 112.6 | 4.4 |
| 2018-10-01 10:38:00 | 116 | 116 | 112.5 | 3.5 |
| 2018-10-01 10:39:00 | 100 | 100 | 112.4 | −12.4 |
| 2018-10-01 10:40:00 | 106 | 106 | 112.2 | −6.2 |
| 2018-10-01 10:41:00 | 102 | 102 | 112.1 | −10.1 |
| 2018-10-01 10:42:00 | 109 | 109 | 111.9 | −2.9 |
| 2018-10-01 10:43:00 | 108 | 108 | 111.7 | −3.7 |
| 2018-10-01 10:44:00 | 102 | 102 | 111.6 | −9.6 |
| 2018-10-01 10:45:00 | 108 | 108 | 111.4 | −3.4 |
| 2018-10-01 10:46:00 | 95 | 95 | 111.2 | −16.2 |
| 2018-10-01 10:47:00 | 115 | 115 | 111.1 | 3.9 |
| 2018-10-01 10:48:00 | 108 | 108 | 110.9 | −2.9 |
| 2018-10-01 10:49:00 | 99 | 99 | 110.7 | −11.7 |
| 2018-10-01 10:50:00 | 126 | 120.5 | 110.6 | 15.4 |
| 2018-10-01 10:51:00 | 212 | 190.1 | 110.4 | 101.6 |
| 2018-10-01 10:52:00 | 147 | 135.5 | 110.3 | 36.7 |
| 2018-10-01 10:53:00 | 134 | 128.2 | 110.2 | 23.8 |
| 2018-10-01 10:54:00 | 122 | 117.5 | 110 | 12 |
| 2018-10-01 10:55:00 | 114 | 114 | 109.9 | 4.1 |
| 2018-10-01 10:56:00 | 97 | 97 | 109.8 | −12.8 |
| 2018-10-01 10:57:00 | 105 | 105 | 109.7 | −4.7 |
| 2018-10-01 10:58:00 | 114 | 114 | 109.6 | 4.4 |
| 2018-10-01 10:59:00 | 114 | 114 | 109.5 | 4.5 |
| 2018-10-01 11:00:00 | 112 | 112 | 109.4 | 2.6 |
| 2018-10-01 11:01:00 | 119 | 119 | 109.3 | 9.7 |
| 2018-10-01 11:02:00 | 102 | 102 | 109.3 | −7.3 |
| 2018-10-01 11:03:00 | 121 | 121 | 109.2 | 11.8 |
| 2018-10-01 11:04:00 | 122 | 122 | 109.1 | 12.9 |
| 2018-10-01 11:05:00 | 103 | 103 | 109.1 | −6.1 |
| 2018-10-01 11:06:00 | 116 | 116 | 109 | 7 |
| 2018-10-01 11:07:00 | 116 | 116 | 109 | 7 |

TABLE 2-continued

| Minute | UVs | iter1: adjusted UVs | iter1: baseline | iter1: minutely lift |
|---|---|---|---|---|
| 2018-10-01 11:08:00 | 99 | 99 | 109 | −10 |
| 2018-10-01 11:09:00 | 110 | 110 | 108.9 | 1.1 |
| 2018-10-01 11:10:00 | 113 | 113 | 108.9 | 4.1 |
| 2018-10-01 11:11:00 | 115 | 115 | 108.9 | 6.1 |
| 2018-10-01 11:12:00 | 122 | 122 | 108.9 | 13.1 |
| 2018-10-01 11:13:00 | 108 | 108 | 108.9 | −0.9 |
| 2018-10-01 11:14:00 | 100 | 100 | 108.9 | −8.9 |
| 2018-10-01 11:15:00 | 109 | 109 | 108.9 | 0.1 |
| 2018-10-01 11:16:00 | 107 | 107 | 108.9 | −1.9 |
| 2018-10-01 11:17:00 | 115 | 115 | 108.9 | 6.1 |
| 2018-10-01 11:18:00 | 94 | 94 | 108.9 | −14.9 |
| 2018-10-01 11:19:00 | 101 | 101 | 108.9 | −7.9 |
| 2018-10-01 11:20:00 | 114 | 114 | 108.9 | 5.1 |
| 2018-10-01 11:21:00 | 105 | 105 | 108.9 | −3.9 |
| 2018-10-01 11:22:00 | 108 | 108 | 108.9 | −0.9 |
| 2018-10-01 11:23:00 | 108 | 108 | 109 | −1 |
| 2018-10-01 11:24:00 | 108 | 108 | 109 | −1 |
| 2018-10-01 11:25:00 | 104 | 104 | 109 | −5 |
| 2018-10-01 11:26:00 | 106 | 106 | 109.1 | −3.1 |
| 2018-10-01 11:27:00 | 109 | 109 | 109.1 | −0.1 |
| 2018-10-01 11:28:00 | 114 | 114 | 109.1 | 4.9 |
| 2018-10-01 11:29:00 | 109 | 109 | 109.1 | −0.1 |
| 2018-10-01 11:30:00 | 108 | 108 | 109.2 | −1.2 |
| 2018-10-01 11:31:00 | 107 | 107 | 109.2 | −2.2 |
| 2018-10-01 11:32:00 | 110 | 110 | 109.2 | 0.8 |
| 2018-10-01 11:33:00 | 103 | 103 | 109.3 | −6.3 |
| 2018-10-01 11:34:00 | 112 | 112 | 109.3 | 2.7 |
| 2018-10-01 11:35:00 | 108 | 108 | 109.3 | −1.3 |
| 2018-10-01 11:36:00 | 100 | 100 | 109.3 | −9.3 |
| 2018-10-01 11:37:00 | 108 | 108 | 109.4 | −1.4 |
| 2018-10-01 11:38:00 | 114 | 114 | 109.4 | 4.6 |
| 2018-10-01 11:39:00 | 106 | 106 | 109.4 | −3.4 |
| 2018-10-01 11:40:00 | 132 | 126.4 | 109.4 | 22.6 |
| 2018-10-01 11:41:00 | 199 | 177 | 109.4 | 89.6 |
| 2018-10-01 11:42:00 | 165 | 153.5 | 109.5 | 55.5 |
| 2018-10-01 11:43:00 | 135 | 129.1 | 109.5 | 25.5 |
| 2018-10-01 11:44:00 | 116 | 111.5 | 109.5 | 6.5 |
| 2018-10-01 11:45:00 | 114 | 114 | 109.5 | 4.5 |
| 2018-10-01 11:46:00 | 105 | 105 | 109.5 | −4.5 |
| 2018-10-01 11:47:00 | 104 | 104 | 109.6 | −5.6 |
| 2018-10-01 11:48:00 | 97 | 97 | 109.6 | −12.6 |
| 2018-10-01 11:49:00 | 112 | 112 | 109.6 | 2.4 |
| 2018-10-01 11:50:00 | 102 | 102 | 109.6 | −7.6 |
| 2018-10-01 11:51:00 | 105 | 105 | 109.6 | −4.6 |
| 2018-10-01 11:52:00 | 112 | 112 | 109.6 | 2.4 |
| 2018-10-01 11:53:00 | 111 | 111 | 109.6 | 1.4 |
| 2018-10-01 11:54:00 | 107 | 107 | 109.7 | −2.7 |
| 2018-10-01 11:55:00 | 109 | 109 | 109.7 | −0.7 |
| 2018-10-01 11:56:00 | 108 | 108 | 109.7 | −1.7 |
| 2018-10-01 11:57:00 | 113 | 113 | 109.7 | 3.3 |
| 2018-10-01 11:58:00 | 106 | 106 | 109.7 | −3.7 |
| 2018-10-01 11:59:00 | 104 | 104 | 109.7 | −5.7 |
| 2018-10-01 12:00:00 | 115 | 115 | 109.7 | 5.3 |

Step 510—The UV subtracted by "prior lift" (e.g., a previously calculated spot lift) is used to fit a baseline through the inception process which applies the LOWESS method iteratively. In this example, the adjusted UV from Table 2 (i.e., data under the column heading "iter1: adjusted UVs" in Table 2) is inputted into the inception process and LOWESS is run iteratively on the adjusted UV to get the fitted baseline shown in Table 2 (i.e., data under the column heading "iter1: baseline" in Table 2).

Step 515—The fitted baseline is, in turn, subtracted from the UVs to calculate the spot lift shown in Table 2 (i.e., data under the column heading "iter1: minutely lift" in Table 2). The calculated spot lift is then attributed to the TV spots, as shown in Table 3 below.

TABLE 3

| Minute | Initial CPV Spend | $4.00 Initial: Lift | Attributed from UVs - iter1: baseline iter: lift |
|---|---|---|---|
| 2018-10-01 9:10:00 | 200 | 50.0 | 180.9 |
| 2018-10-01 9:40:00 | 200 | 50.0 | 177.6 |
| 2018-10-01 9:45:00 | 200 | 50.0 | 159.1 |
| 2018-10-01 9:50:00 | 200 | 50.0 | 160.7 |
| 2018-10-01 9:55:00 | 200 | 50.0 | 160.1 |
| 2018-10-01 10:00:00 | 200 | 50.0 | 192.1 |
| 2018-10-01 10:00:00 | 200 | 50.0 | 192.1 |
| 2018-10-01 10:05:00 | 200 | 50.0 | 172.2 |
| 2018-10-01 10:10:00 | 200 | 50.0 | 166 |
| 2018-10-01 10:15:00 | 200 | 50.0 | 181.8 |
| 2018-10-01 10:50:00 | 200 | 50.0 | 189.4 |
| 2018-10-01 11:40:00 | 200 | 50.0 | 199.7 |

Example outputs from additional iterations are included in the accompanying Appendix A, which forms part of this disclosure.

The calculated spot lift is set as "prior lift" and steps 505, 510, and 515 are iterated until the calculated spot lift is within a threshold of the prior lift. Alternatively, steps 505, 510, and 515 are iterated for a predetermine number of iterations.

FIG. 7 is a plot diagram showing effects of different baselining approaches. In FIG. 7, baseline 720 is generated using a moving average baselining approach and baseline 730 is generated utilizing the SCI baselining approach described above. Different baselines determined utilizing different baselining approaches can affect subsequent computations and, consequently, real world decision making processes.

For instance, UV curve 710 shown in FIG. 7 shows UV traffic to a website has visible traffic spikes that correspond to TV spots airing. To compute the UV lift for each TV spot, the baseline is subtracted from the spike. FIG. 8 is a bar graph showing different UV lifts 820, 830 computed for each spot based on the different baselining approaches illustrated in FIG. 7.

The computed UV lifts 820, 830 can then be used to determine overall TV performance for the day, for instance, a cost per incremental visitor (CPV) metric. As a non-limiting example, the CPV generated utilizing the moving average baselining approach can be $6.67, while the CPV generated utilizing the SCI baselining approach can be $4.64. Having an accurate reflection of performance is important to a decision maker (e.g., a user of client device 230*a*). In this case, knowing that the CPV is actually $4.64 (and not $6.67) is very valuable in practice to the decision maker from a strategic point of view as the decision maker can assess the efficacy of the TV spot airing channel and determine appropriate action.

That is, the decision maker can use the CPV computations, which can be visualized through a user interface such as dashboard 900 shown in FIG. 9, to understand the overall cost of the acquisition of a website visitor as well as to optimize their TV spot campaign by determining which networks work best for airing their TV spots. As illustrated in FIG. 9, in addition to CPV, other metrics such as Cost Per Install (CPI) can also be included in the report shown on dashboard 900.

Figure 10:
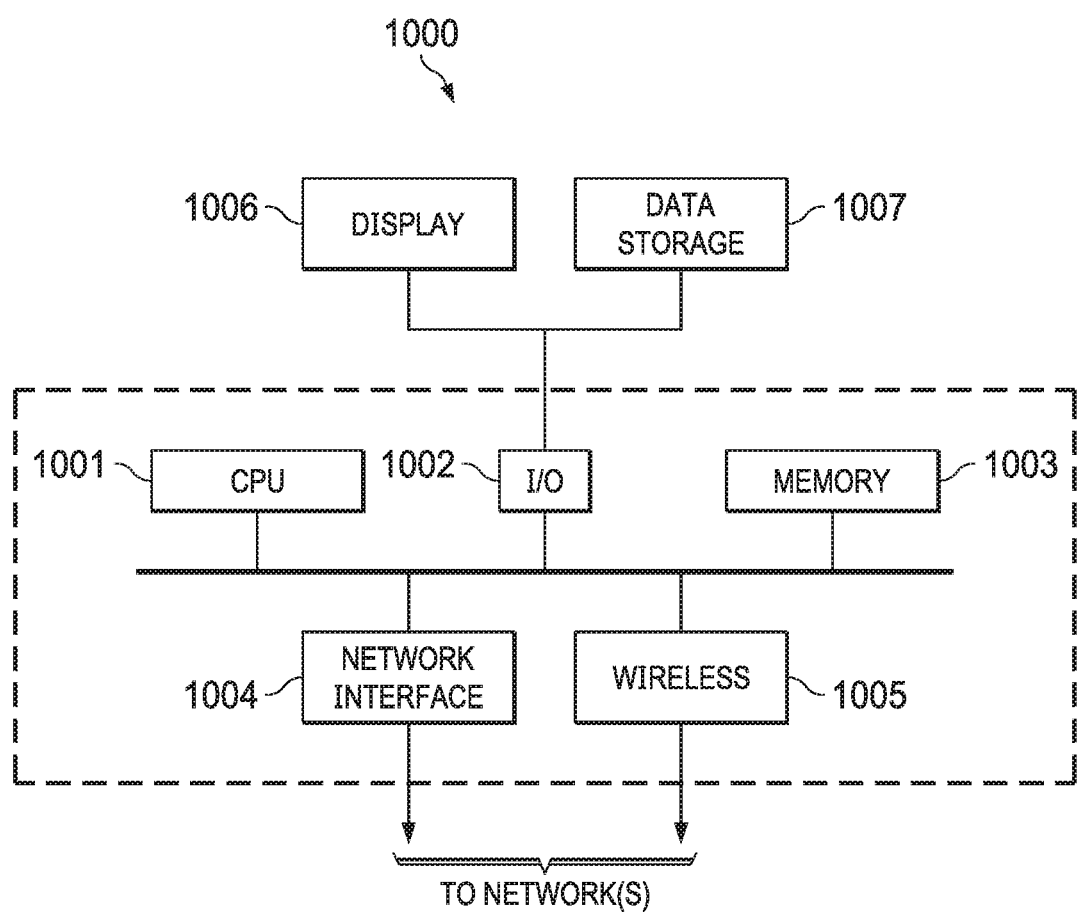
FIG. 10 depicts a diagrammatic representation of a data processing system for implementing a system according to some embodiments disclosed herein.

FIG. 10 depicts a diagrammatic representation of a data processing system for implementing a system for processing messages. As shown in FIG. 10, data processing system 1000 may include one or more central processing units (CPU) or processors 1001 coupled to one or more user input/output (I/O) devices 1002 and memory devices 1003. Examples of I/O devices 1002 may include, but are not limited to, keyboards, displays, monitors, touch screens, printers, electronic pointing devices such as mice, trackballs, styluses, touch pads, or the like. Examples of memory devices 1003 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 1000 can be coupled to display 1006, information device 1007 and various peripheral devices (not shown), such as printers, plotters, speakers, etc. through I/O devices 1002. Data processing system 1000 may also be coupled to external computers or other devices through network interface 1004, wireless transceiver 1005, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including Python. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise. The scope of the present disclosure should be determined by the following claims and their legal equivalents.

What is claimed is:

1. A self-consistent baselining method, comprising:
receiving, by a computer, online data from one or more spot airing data providers, the online data relating to a television (TV) spot airing on an offline medium, the online data comprising user activity on entity's website and associated with a particular time when the activity occurred;
receiving, by the computer, offline data from the one or more spot airing data providers, the offline data relating to a television (TV) spot airing on an offline medium, wherein the offline data is associated with the entity and is associated with a particular time that the TV spot aired;
determining, by the computer based on the online data and offline data, an estimated lift in a number of unique visitors (UVs) to a website caused by the TV spot airing on the offline medium, the estimated lift representing a prior lift;
adjusting, by the computer utilizing the prior lift, a UV profile of the website, wherein the UV profile of the website comprises a temporal response pattern observable from website traffic data and wherein the temporal response pattern comprises a number of UVs at the entity's website on a minute-by-minute basis within a time window after the TV spot airing on the offline medium;
fitting, by the computer, a baseline through an inception process in which a locally weighted scatterplot smoothing (LOWESS) algorithm is applied iteratively until a final baseline converges;
computing, by the computer utilizing the final baseline from the inception process, a calculated lift in the number of UVs to the website caused by the TV spot airing on the offline medium;
comparing, by the computer, the prior lift and the calculated lift for consistency;
iteratively performing, by the computer, the adjusting, the fitting, the computing, and the comparing until the prior lift and the calculated lift are consistent;
determining, by a performance analyzer utilizing the calculated lift consistent with the prior lift, various performance metrics relating to the TV spot airing on the offline medium;
generating, by a visualizer, visualizations based on the various performance metrics; and
presenting to a user, by the computer through a user interface, a dashboard displaying the generated visualizations based on the various performance metrics.

2. The self-consistent baselining method of claim 1, wherein the online data comprises the number of unique visitors to the website over a period of time during which the TV spot airing on the offline medium, wherein the offline data comprises spot airing time and spend associated with the TV spot, and wherein the estimated lift is determined utilizing at least the spend associated with the TV spot.

3. The self-consistent baselining method of claim 1, wherein the adjusting comprises subtracting the prior lift from a UV line to thereby generate the baseline for the inception process, the baseline including the UV profile.

4. The self-consistent baselining method of claim 1, wherein the inception process comprises applying the LOWESS continuously until a final LOWESS baseline converges to a constant line.

5. The self-consistent baselining method of claim 1, wherein the comparing further comprises, responsive to a determination that the calculated lift is not within a threshold of the prior lift, setting the calculated lift as the prior lift.

6. The self-consistent baselining method of claim 1, wherein the calculated lift is computed by subtracting the final baseline from the number of UVs to the website.

7. A system, comprising:
a processor;
a non-transitory computer-readable medium; and
stored instructions translatable by the processor for:
receiving online data from one or more spot airing data providers, the online data relating to a television (TV) spot airing on an offline medium, the online data comprising user activity on entity's website and associated with a particular time when the activity occurred;
receiving offline data from the one or more spot airing data providers, the offline data relating to a television (TV) spot airing on an offline medium, wherein the offline data is associated with the entity and is associated with a particular time that the TV spot aired;
determining, based on the online data and offline data, an estimated lift in a number of unique visitors (UVs) to a website caused by the TV spot airing on the offline medium, the estimated lift representing a prior lift;
adjusting, utilizing the prior lift, a UV profile of the website, wherein the UV profile of the website comprises a temporal response pattern observable from website traffic data and wherein the temporal response pattern comprises a number of UVs at the entity's website on a minute-by-minute basis within a time window after the TV spot airing on the offline medium;
fitting a baseline through an inception process in which a locally weighted scatterplot smoothing (LOWESS) algorithm is applied iteratively until a final baseline converges;
computing, utilizing the final baseline from the inception process, a calculated lift in the number of UVs to the website caused by the TV spot airing on the offline medium;
comparing the prior lift and the calculated lift for consistency;
iteratively performing the adjusting, the fitting, the computing, and the comparing until the prior lift and the calculated lift are consistent;
determining, utilizing the calculated lift consistent with the prior lift, various performance metrics relating to the TV spot airing on the offline medium;
generating visualizations based on the various performance metrics; and
presenting to a user, through a user interface, a dashboard displaying the generated visualizations based on the various performance metrics.

8. The system of claim 7, wherein the online data comprises the number of unique visitors to the website over a period of time during which the TV spot airing on the offline medium, wherein the offline data comprises spot airing time and spend associated with the TV spot, and wherein the estimated lift is determined utilizing at least the spend associated with the TV spot.

9. The system of claim 7, wherein the adjusting comprises subtracting the prior lift from a UV line to thereby generate the baseline for the inception process, the baseline including the UV profile.

10. The system of claim 7, wherein the inception process comprises applying the LOWESS continuously until a final LOWESS baseline converges to a constant line.

11. The system of claim 7, wherein the comparing further comprises, responsive to a determination that the calculated lift is not within a threshold of the prior lift, setting the calculated lift as the prior lift.

12. The system of claim 7, wherein the calculated lift is computed by subtracting the final baseline from the number of UVs to the website.

13. A computer program product comprising a non-transitory computer-readable medium storing instructions translatable by a processor for:
receiving online data from one or more spot airing data providers, the online data relating to a television (TV) spot airing on an offline medium, the online data comprising user activity on entity's website and associated with a particular time when the activity occurred;
receiving offline data from the one or more spot airing data providers, the offline data relating to a television (TV) spot airing on an offline medium, wherein the offline data is associated with the entity and is associated with a particular time that the TV spot aired;
determining, based on the online data and offline data, an estimated lift in a number of unique visitors (UVs) to a website caused by the TV spot airing on the offline medium, the estimated lift representing a prior lift;
adjusting, utilizing the prior lift, a UV profile of the website, wherein the UV profile of the website comprises a temporal response pattern observable from website traffic data and wherein the temporal response pattern comprises a number of UVs at the entity's website on a minute-by-minute basis within a time window after the TV spot airing on the offline medium;
fitting a baseline through an inception process in which a locally weighted scatterplot smoothing (LOWESS) algorithm is applied iteratively until a final baseline converges;
computing, utilizing the final baseline from the inception process, a calculated lift in the number of UVs to the website caused by the TV spot airing on the offline medium;
comparing the prior lift and the calculated lift for consistency;
iteratively performing the adjusting, the fitting, the computing, and the comparing until the prior lift and the calculated lift are consistent;
determining, utilizing the calculated lift consistent with the prior lift, various performance metrics relating to the TV spot airing on the offline medium;
generating, by a visualizer, visualizations based on the various performance metrics; and
presenting, through a user interface, a dashboard displaying the generated visualizations based on the various performance metrics.

14. The computer program product of claim 13, wherein the online data comprises the number of unique visitors to the website over a period of time during which the TV spot airing on the offline medium, wherein the offline data comprises spot airing time and spend associated with the TV spot, and wherein the estimated lift is determined utilizing at least the spend associated with the TV spot.

15. The computer program product of claim 13, wherein the adjusting comprises subtracting the prior lift from a UV line to thereby generate the baseline for the inception process, the baseline including the UV profile.

16. The computer program product of claim 13, wherein the comparing further comprises, responsive to a determination that the calculated lift is not within a threshold of the prior lift, setting the calculated lift as the prior lift.

17. The computer program product of claim 13, wherein the calculated lift is computed by subtracting the final baseline from the number of UVs to the website.

\* \* \* \* \*